US009730262B2

(12) United States Patent
Lee

(10) Patent No.: US 9,730,262 B2
(45) Date of Patent: Aug. 8, 2017

(54) METHOD FOR CONTROLLING COMMUNICATION AND ELECTRONIC DEVICE THEREOF

(71) Applicant: Samsung Electronics Co., Ltd., Suwon-si, Gyeonggi-do (KR)

(72) Inventor: Myunghwan Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/988,071

(22) Filed: Jan. 5, 2016

(65) Prior Publication Data
US 2016/0198515 A1    Jul. 7, 2016

(30) Foreign Application Priority Data

Jan. 6, 2015  (KR) .................. 10-2015-0001049
Dec. 11, 2015 (KR) .................. 10-2015-0177337

(51) Int. Cl.
*H04W 76/02*   (2009.01)
*H04W 4/00*    (2009.01)
*H04W 36/00*   (2009.01)
*H04W 76/06*   (2009.01)
*H04M 3/58*    (2006.01)

(52) U.S. Cl.
CPC .......... *H04W 76/027* (2013.01); *H04M 3/58* (2013.01); *H04W 4/008* (2013.01); *H04W 36/0011* (2013.01); *H04W 76/026* (2013.01); *H04W 76/064* (2013.01); *H04M 2250/02* (2013.01)

(58) Field of Classification Search
CPC ........... H04M 3/42391; H04M 3/5116; H04M 1/7255; H04M 1/72541; H04M 3/541; H04M 1/72572; H04M 15/7652; H04W 4/22; H04W 4/02; H04W 4/023; H04W 4/16; H04W 4/18; H04W 4/20;
(Continued)

(56) References Cited

U.S. PATENT DOCUMENTS

2009/0111472 A1   4/2009  Promenzio et al.
2009/0280818 A1  11/2009  Chavez et al.
(Continued)

FOREIGN PATENT DOCUMENTS

KR    10-2010-0086019 A    7/2010
WO       2013067169 A1     5/2013

OTHER PUBLICATIONS

Use Call Waiting or 3-Way Calling with Motorola ATRIX 2 (MB865) using Android 4, http://www.att.com/esupport/article.jsp?sid=KB415246&cv=821#fbid=Kfsxo6bqUnA.

*Primary Examiner* — Phuoc H Doan
(74) *Attorney, Agent, or Firm* — Jefferson IP Law, LLP

(57) ABSTRACT

A method of operating a first electronic device for improving call quality is provided. The method includes the operations of transmitting call data received through a first call between the first electronic device and a third electronic device to a second electronic device, using short-range wireless communication connected with the second electronic device, if a communication abnormality of the short-range wireless communication takes place, connecting a second call between the first electronic device and the second electronic device, generating a third call by merging the first call and the second call, and releasing a call connection of the first electronic device from the third call.

20 Claims, 15 Drawing Sheets

(58) Field of Classification Search
CPC ... H04W 76/025; H04W 36/18; H04W 4/008; H04L 65/1016
USPC ............ 455/509, 41.2, 41.1; 370/328; 379/88.01, 88.03
See application file for complete search history.

(56) References Cited

U.S. PATENT DOCUMENTS

| | | | | |
|---|---|---|---|---|
| 2014/0087705 | A1* | 3/2014 | Wooster | H04B 5/0031 455/416 |
| 2015/0146683 | A1* | 5/2015 | Cazanas | H04W 36/18 370/331 |

* cited by examiner

METHOD FOR CONTROLLING COMMUNICATION AND ELECTRONIC DEVICE THEREOF

CROSS-REFERENCE TO RELATED APPLICATION(S)

This application claims the benefit under 35 U.S.C. §119 (a) of a Korean patent application filed on Jan. 6, 2015 in the Korean Intellectual Property Office and assigned Serial number 10-2015-0001049 and of a Korean patent application filed on Dec. 11, 2015 in the Korean Intellectual Property Office and assigned Serial number 10-2015-0177337, the entire disclosure of each of which is hereby incorporated by reference.

TECHNICAL FIELD

The present disclosure relates to a method for controlling communication in an electronic device and the electronic device thereof.

BACKGROUND

A user can interlock and use an electronic device (e.g., a smartphone) and another electronic device (e.g., a wearable device, a smartwatch, and a headset) wearable on the user's body. In case that the user of the electronic device makes a call with a counterpart of another electronic device connected by cellular communication, the electronic device can relay the call to the wearable device using short-range wireless communication. However, in case that the short-range wireless communication connected between the electronic device and the wearable device becomes an unstable communication state, a loss of a call quality can occur. Or, in case that the short-range wireless communication between the electronic device and the wearable device is connection released, a call between the user and the counterpart can be interrupted.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for improving a call quality, when a communication abnormality of short-range wireless communication connected with a wearable electronic device takes place in a state in which an electronic device is connected with another electronic device through cellular communication and provides a call connected with another electronic device to the wearable device connected through the short-range wireless communication.

In accordance with an aspect of the present disclosure, an operation method of a first electronic device is provided. The operation method includes the operations of transmitting call data received through a first call between the first electronic device and a third electronic device to a second electronic device, using short-range wireless communication connected with the second electronic device, if a communication abnormality of the short-range wireless communication takes place, connecting a second call between the first electronic device and the second electronic device, generating a third call by merging the first call and the second call, and releasing the call connection of the first electronic device from the third call.

In accordance with another aspect of the present disclosure, an operation method of a second electronic device is provided. The operation method includes the operations of receiving call data received through a first call between a first electronic device and a third electronic device using short-range wireless communication connected with the first electronic device, from the first electronic device, if a communication abnormality of the short-range wireless communication takes place, connecting a second call between the first electronic device and the second electronic device, and directly connecting a call between the second electronic device and the third electronic device by releasing the call connection of the first electronic device from a third call generated from the merging of the first call and the second call.

In accordance with another aspect of the present disclosure, a first electronic device is provided. The first electronic device includes a short-range wireless communication module supporting short-range wireless communication, a cellular communication module supporting cellular communication, and a processor. The processor transmits call data received through a first call between the first electronic device and a third electronic device to a second electronic device, using the short-range wireless communication connected with the second electronic device, if a communication abnormality of the short-range wireless communication takes place, connects a second call between the first electronic device and the second electronic device, generates a third call by merging the first call and the second call, and releases the call connection of the first electronic device from the third call.

In accordance with another aspect of the present disclosure, a second electronic device is provided. The second electronic device includes a short-range wireless communication module supporting short-range wireless communication, a cellular communication module supporting cellular communication, and a processor. The processor receives call data received through a first call between a first electronic device and a third electronic device using the short-range wireless communication connected with the first electronic device, from the first electronic device, if a communication abnormality of the short-range wireless communication takes place, connects a second call between the first electronic device and the second electronic device, and directly connects a call between the second electronic device and the third electronic device by releasing the call connection of the first electronic device from a third call generated from the merging of the first call and the second call.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
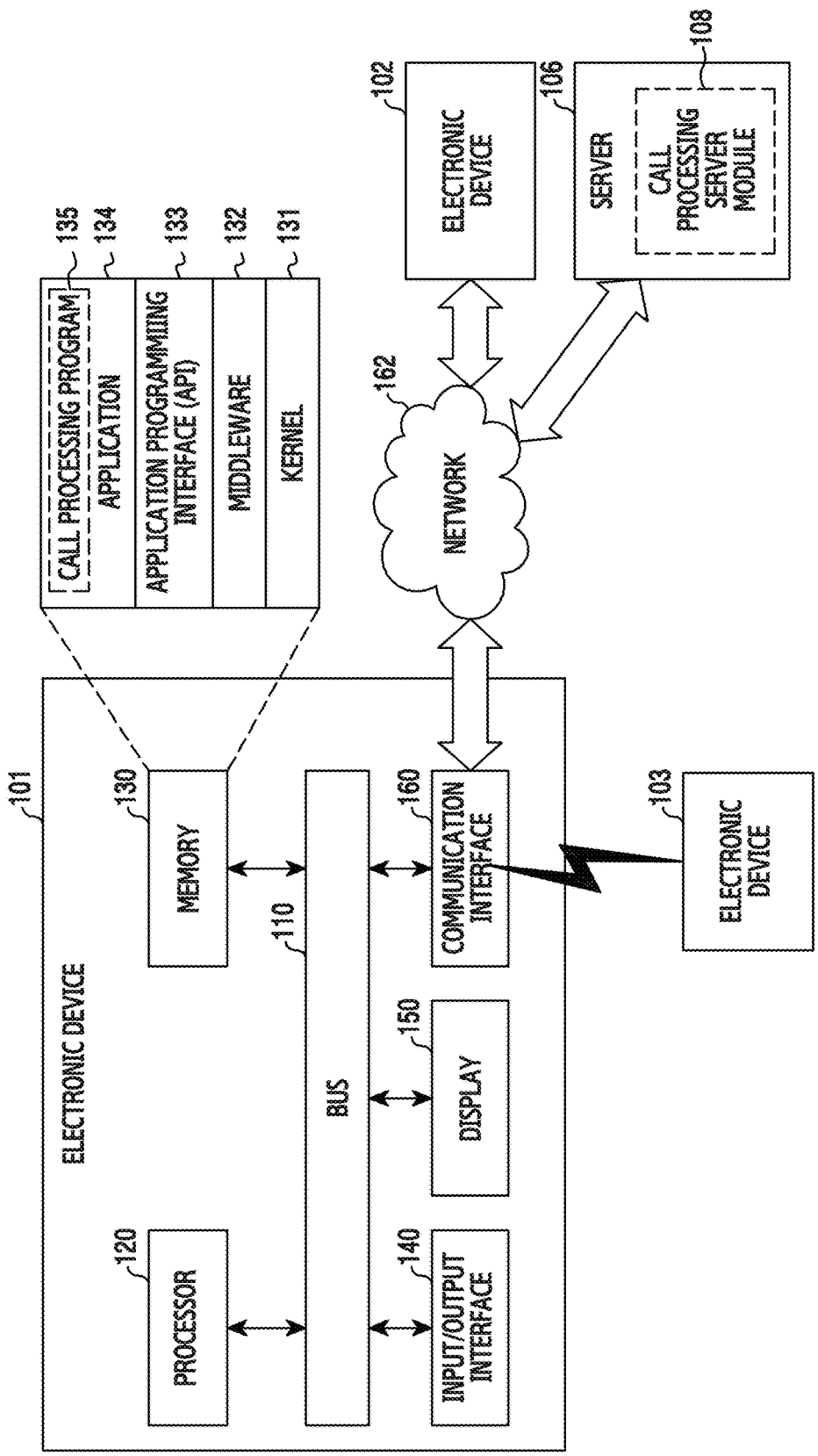
FIG. 1 is a diagram illustrating a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Expressions such as "include" or "may include", etc. that may be used in the disclosure indicate existence of a disclosed relevant function, operation, or element, etc., and do not limit additional one or more functions, operations, or elements, etc. Also, it should be understood that terminologies such as "include" or "have", etc. in the disclosure are intended for designating existence of a characteristic, a number, an operation, an element, a part, or a combination of these described on the specification and do not exclude in advance existence or addition possibility of one or more other characteristics, numbers, operations, elements, parts, or a combination of these.

Expression such as "or", etc. in the disclosure includes a certain and all combinations of words listed together. For example, "A or B" may include A and may include B, or include both A and B.

In the disclosure, expressions such as "1st", "2nd", "first" or "second", etc. may modify various elements of the disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses, and represent different user apparatuses. For example, a first element may be named as a second element without departing from the scope of the disclosure, and similarly, the second element may be named as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element does not exist in the middle.

Terminology used in the disclosure is used for explaining only a specific example and is not intended to limit the disclosure. Unless clearly expressed otherwise, expression of the singular includes expression of the plural.

Unless defined differently, all terminologies used herein including technological or scientific terminologies have the same meaning as that generally understood by a person of ordinary skill in the art to which the disclosure belongs. It should be understood that generally used terminologies defined by a dictionary have meaning coinciding with meaning on context of a related technology, and unless clearly defined in the disclosure, they are not understood as an ideal or excessively formal meaning.

An electronic device of disclosure may be a device including a communication function. For example, an electronic device may include at least one of a smartphone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, or a wearable device (e.g., a head-mounted-device (HMD) such as electronic glasses, an electronic clothing, an electronic bracelet, an electronic necklace, an electronic appcessory, an electronic tattoo, or a smartwatch).

According to certain examples, an electronic device may be a smart home appliance having a communication function. A smart home appliance may include, for example, at least one of a television, a digital video disc (DVD) player, an audio, a refrigerator, an air conditioner, a cleaner, an oven, an electronic range, a washing machine, an air purifier, a set-top box, a television (TV) box (e.g., Samsung HomeSync™, Apple TV™, or Google TV™), game consoles, an electronic dictionary, an electronic key, a camcorder, or an electronic frame.

According to certain examples, an electronic device may include at least one of various medical devices (e.g., magnetic resonance angiography (MRA), magnetic resonance imaging (MRI), computed tomography (CT), a shooting device, an ultrasonic device, etc.), a navigation device, a global positioning system (GPS) receiver, an event data recorder (EDR), a flight data recorder (FDR), an automobile infotainment device, electronic equipment for a ship (e.g., a navigation device for a ship, a gyro compass, etc.), an avionics, a security device, or a robot for an industrial use or a home use.

According to certain examples, an electronic device may include at least one of a furniture or a portion of a building/structure including a communication function, an electronic board, an electronic signature receiving device, a projector, or various measurement devices (e.g., waterworks, electricity, gas, or radio wave measuring device, etc.). An electronic device according to the disclosure may be a combination of one or more of the above-described devices. Also, it will be apparent to one skilled in the art that the electronic device examples of the disclosure are not limited to the above-described devices.

An electronic device according to various examples of the present disclosure is described with reference to the accompanying drawings. A terminology of a user used in various examples may indicate a person who uses an electronic device or a device (e.g., an artificial intelligence electronic device) that uses the electronic device.

FIG. 1 is a diagram illustrating a network environment including an electronic device according to various embodiments of the present disclosure.

Referring to FIG. 1, the electronic device 101 (ex: the first electronic device 101) may include a bus 110, a processor 120, a memory 130, an input/output (I/O) interface 140, a display 150, and a communication interface 160.

The bus 110 may, for example, be a circuit for connecting the above-described elements with each other, and transferring communication (e.g., a control message) between the above-described elements.

The processor 120 may receive, for example, an instruction from the above-described other elements (e.g., the memory 130, the I/O interface 140, the display 150, or the communication interface 160, etc.) via the bus 110, decipher the received instruction, and execute an operation or a data process corresponding to the deciphered instruction.

At least one processor 120 may be included in the electronic device 101 to perform a specified function of the electronic device 101. According to an embodiment of the present disclosure, the processor 120 may include one or more application processors (APs) and one or more microcontroller units (MCUs). According to another embodiment of the present disclosure, the processor 120 may include one or more MCUs as applications, or may be functionally connected to one or more MCUs. In FIG. 1, the APs and the MCUs may be included in one integrated circuit (IC) package, or may be separately configured to be included in different IC packages, respectively. According to an embodiment of the present disclosure, the MCUs may also be included in an IC package of the APs so as to be configured as one IC package together with the APs. Although the processor 120 is illustrated as including the APs or the MCUs, it is nothing more than an embodiment for clear understanding, and it is apparent that the processor 120 may also perform the operations of the APs and/or the MCUs.

The APs may control a plurality of hardware or software elements connected thereto and may perform processing and operations on various types of data including multimedia data by driving an operating system (OS) or application programs (or applications). The APs may be embodied as, for example, a system on chip (SoC). According to an embodiment of the present disclosure, the processor 120 may further include a graphics processing unit (GPU) (not illustrated).

The MCUs may be processors configured to perform specified operations. According to an embodiment of the present disclosure, the MCUs may acquire sensing information through one or more specified motion sensors (e.g., a gyro sensor, an acceleration sensor, and a geomagnetic sensor), compare the acquired sensing information, and determine the respective operating states of the specified sensors with reference to a database of the electronic device 101.

According to an embodiment of the present disclosure, the APs or the MCUs may load instructions or data received from at least one of non-volatile memories or other elements connected thereto in volatile memories, and may process the loaded instructions or data. Furthermore, the APs or the MCUs may store data received from or generated by at least one of the other elements in the non-volatile memories.

The memory 130 may store commands or data (e.g., a reference pattern or a reference touch area) associated with one or more other components of the electronic device 101. According to an embodiment of the present disclosure, the memory 130 may store software and/or a program. For example, the program may include a kernel 131, a middleware 132, an application programming interface (API) 133, an application program 134, or the like. At least some of the kernel 131, the middleware 132, and the API 133 may be referred to as an OS.

The kernel 131 may control or manage system resources (e.g., the bus 110, the processor 120, or the memory 130) used for performing an operation or function implemented by the other programs (e.g., the middleware 132, the API 133, or the applications 134). Furthermore, the kernel 131 may provide an interface through which the middleware 132, the API 133, or the applications 134 may access the individual elements of the electronic device 101 to control or manage the system resources.

The middleware 132, for example, may function as an intermediary for allowing the API 133 or the applications 134 to communicate with the kernel 131 to exchange data. In addition, the middleware 132 may process one or more task requests received from the applications 134 according to priorities thereof. For example, the middleware 132 may assign priorities for using the system resources (e.g., the bus 110, the processor 120, the memory 130, or the like) of the electronic device 101, to at least one of the applications 134. For example, the middleware 132 may perform scheduling or loading balancing on the one or more task requests by processing the one or more task requests according to the priorities assigned thereto.

The API 133 is an interface through which the applications 134 control functions provided from the kernel 131 or the middleware 132, and may include, for example, at least one interface or function (e.g., instruction) for file control, window control, image processing, or text control.

The application (or the processor) 134 may include a short message service (SMS)/multimedia message service (MMS) application, an electronic mail (e-mail) application, a calendar application, an alarm application, a health care application (e.g., an application measuring momentum or blood sugar, etc.), or an environment information application (e.g., an application providing air pressure, humidity or temperature information, etc.), etc. The application (or the processor) 134 may be an application related with information exchange between the first electronic device 101 and an external electronic device (e.g., a second electronic device 102 or an electronic device 103). The application related with the information exchange may, for example, include a notification relay application for relaying specific information to the external electronic device or a device management application for managing the external electronic device.

In examples of the aforementioned applications, the notification relay application may include a function of relaying notification information generated in another application (e.g., the SMS/MMS application, the e-mail application, the health care application or the environment information application, etc.) of the first electronic device 101, to the external electronic device (e.g., the electronic device 103). Additionally or alternatively, the notification relay application may, for example, receive notification information from the external electronic device (e.g., the electronic device 103) and provide the received notification information to a user.

The device management application may, for example, manage (e.g., install, delete or update) a function (e.g., turn-on/turn-off of the external electronic device itself (or some constituent components) or adjustment of a brightness (or resolution) of a display) of at least a part of the external electronic device (e.g., the electronic device 103 communicating with the first electronic device 101, an application operating in the external electronic device, or a service (e.g., a telephony service or a message service) provided from the external electronic device.

According to various embodiments of the present disclosure, the applications 134 may include an application designated according to an attribute (e.g., the kind of an electronic device) of the external electronic device (e.g., the second electronic device 102 or the electronic device 103). For example, if the external electronic device is an MP3 player, the applications 134 may include an application related with music playing. Similarly, if the external electronic device is a mobile medical instrument, the applications 134 may include an application related with health care. According to an embodiment of the present disclosure, the applications 134 may include at least one of an application designated to the first electronic device 101 or an application received from the external electronic device (e.g., the server 106 or the electronic device 103).

The call processing program 135 may be included and provided in the applications 134, or may be stored in the memory 130 as a separate program. For example, the call processing program 135 may connect a call between the first electronic device 101 and the second electronic device 102, and connect a call between the first electronic device 101 and the third electronic device 103. And, the call processing program 135 may merge the call between the first electronic device 101 and the second electronic device 102 and the call between the first electronic device 101 and the third electronic device 103, thereby building a multilateral call environment. And, the call processing program 135 may release a call of the first electronic device 101 from the merged calls, thereby directly connecting a call between the second electronic device 102 and the third electronic device 103.

According to an embodiment of the present disclosure, the call processing program 135 may use short-range wireless communication to transmit to the third electronic device 103 call data (e.g., voice data or multimedia data including the voice data and picture data) between the first electronic device 101 and the second electronic device 102 which are connected using cellular communication. According to an embodiment of the present disclosure, the call processing program 135 may receive call data from the third electronic device 103 using the short-range wireless communication, and transmit the received call data to the second electronic device 102 using the cellular communication.

According to an embodiment of the present disclosure, the call processing program 135 may receive a multilateral call invitation request message from the third electronic device 103. For example, the multilateral call invitation request message may be a message of requesting to invite the third electronic device 103 to a call between the first electronic device 101 and the second electronic device 102. For example, the multilateral call invitation request message may include unique identification information (for example, a phone number or a media access control (MAC) address) granted to the third electronic device 103.

According to an embodiment of the present disclosure, if a multilateral call invitation request message is received from the third electronic device 103, the call processing program 135 may generate a multilateral call request message and send the generated multilateral call request message to a base station (BS). For example, the multilateral call request message may be a message of requesting to add a call between the first electronic device 101 and the third electronic device 103 to a call being currently connecting. For example, the multilateral call request message may include unique identification information of the third electronic device 103. According to an embodiment of the present disclosure, if the call between the first electronic device 101 and the third electronic device 103 is connected, the call processing program 135 may generate a call merge request message and send the generated call merge request message to the BS. For example, the call merge request message may be a message of requesting to merge a call between the first electronic device 101 and the second electronic device 102 and the call between the first electronic device 101 and the third electronic device 103.

According to an embodiment of the present disclosure, if a call between the first electronic device 101 and the second electronic device 102 and a call between the first electronic device 101 and the third electronic device 103 are merged with each other, the call processing program 135 may generate a call connection release message, and send the generated call connection release message to the BS. For example, the call connection release message may be a message of requesting to release a call connection of the first electronic device 101 from the merged calls. According to an embodiment of the present disclosure, the call processing program 135 may release a call connection between the first electronic device 101 and the BS such that it may directly connect the call between the second electronic device 102 and the third electronic device 103.

According to an embodiment of the present disclosure, in case that it is sensed that there is a communication abnormality of short-range wireless communication connected between the first electronic device 101 and the third electronic device 103, the call processing program 135 may generate a multilateral call request message and send the generated multilateral call request message to the BS. According to an embodiment of the present disclosure, the communication abnormality of the short-range wireless communication may include a case that the short-range wireless communication becomes an unstable communication state or a case that the short-range wireless communication is connection released. According to an embodiment of the present disclosure, the call processing program 135 may release a short-range wireless communication connection connected between the first electronic device 101 and the third electronic device 103.

According to an embodiment of the present disclosure, the call processing program 135 may send the third electronic device 103 a message of requesting to turn On a power source of at least one communication module included in the third electronic device 103, using short-range wireless communication. According to an embodiment of the present disclosure, the call processing program 135 may output a notification message of notifying directly connecting a call between the second electronic device 102 and the third electronic device 103 due to a communication abnormality of the short-range wireless communication. For example, the call processing program 135 may display the notification message through the display 150, or output the notification message through a microphone of the first electronic device 101.

The I/O interface 140 may forward an instruction or data inputted from a user through an I/O device (e.g., various sensors such as an acceleration sensor and a gyro sensor and/or a device such as a keyboard or a touch screen), for example, to the processor 120, the memory 130 or the communication interface 160 through the bus 110. For example, the I/O interface 140 may provide data about a user's touch inputted through a touch screen, to the processor 120. Also, the I/O interface 140 may, for example, output an instruction or data received from the processor 120, the memory 130 and the communication interface 160 through the bus 110, through an output device (e.g., a speaker or the display 150). For example, the I/O interface 140 may output voice data processed by the processor 120, to a user through the speaker.

The display 150 may display various information (e.g., multimedia data or text data, etc.) to a user. Also, the display 150 may be comprised of a touch screen for inputting an instruction by touching or proximity touching an input means to a display.

The communication interface 160 (e.g., the communication module 220) may connect a communication between the first electronic device 101 and the external device (e.g., the electronic device 103 or the server 106). For example, the communication interface 160 may connect to a network 162 through wireless communication or wired communication, and communicate with the external device. The wireless communication may include, for example, at least one of short-range wireless communication such as WiFi, Bluetooth (BT), near field communication (NFC), and GPS, or cellular communication (e.g., long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM)). The wired communication may include, for example at least one of a universal serial bus (USB), a high definition multimedia interface (HDMI), a recommended standard-232 (RS-232), or a plain old telephone service (POTS).

According to an embodiment of the present disclosure, the network 162 may be a telecommunications network. The telecommunications network may include at least one of a computer network, the Internet, internet of things (IoT), or a telephone network. According to an embodiment of the present disclosure, a protocol (e.g., a transport layer protocol, a data link layer protocol, or a physical layer protocol) for a communication between the first electronic device 101 and the external device may be supported in at least one of the applications 134, the API 133, the middleware 132, the kernel 131, or the communication interface 160.

According to an embodiment of the present disclosure, the server 106 may support driving of the first electronic device 101 by performing at least one operation among operations (or functions) implemented in the first electronic device 101. For example, the server 106 may include a server module (e.g., a server controller or server processor) capable of supporting a processor controlling to perform various embodiments performed in the first electronic device 101 or a specific module designated to perform the various embodiments. For instance, the server module may include at least one constituent element among the processor 120 or the specific module (e.g., the call processing program 135) and perform (e.g., act) at least one operation among operations carried out by the processor 120 or specific module. According to various embodiments of the present disclosure, the server module may denote the call processing server module 108 of FIG. 1.

According to an embodiment of the present disclosure, the server 106 may be a BS. For example, the BS may connect a call between the first electronic device 101 and the second electronic device 102, and connect a call between the first electronic device 101 and the third electronic device 103. For example, the BS may merge the call between the first electronic device 101 and the second electronic device 102 and the call between the first electronic device 101 and the third electronic device 103. For example, the BS may release a call connection between the first electronic device 101 and the BS so as to directly connect a call between the second electronic device 102 and the third electronic device 103.

According to an embodiment of the present disclosure, the third electronic device 103 may be a wearable device (e.g., a headset or smartwatch). For example, if it is sensed that a short-range wireless communication state between the first electronic device 101 and the third electronic device 103 is abnormal, the third electronic device 103 may generate a multilateral call invitation request message, and send the multilateral call invitation request message to the first electronic device 101 using short-range wireless communication.

According to an embodiment of the present disclosure, the third electronic device 103 may connect a call between the first electronic device 101 and the third electronic device 103. And, the third electronic device 103 may check that the call between the first electronic device 101 and the third electronic device 103 and a call between the first electronic device 101 and the second electronic device 102 are merged with each other. And, the call connection of the first electronic device 101 is released from the merged calls through the first electronic device 101, whereby the third electronic device 103 may directly connect a call between the second electronic device 102 and the third electronic device 103.

According to an embodiment of the present disclosure, the second electronic device 102 may connect a call between the first electronic device 101 and the second electronic device 102. The second electronic device 102 may check that the call between the first electronic device 101 and the third electronic device 103 and the call between the first electronic device 101 and the second electronic device 102 are merged with each other. And, the call connection of the first electronic device 101 is released from the merged calls, whereby the second electronic device 102 may directly connect the call between the second electronic device 102 and the third electronic device 103.

Figure 2:
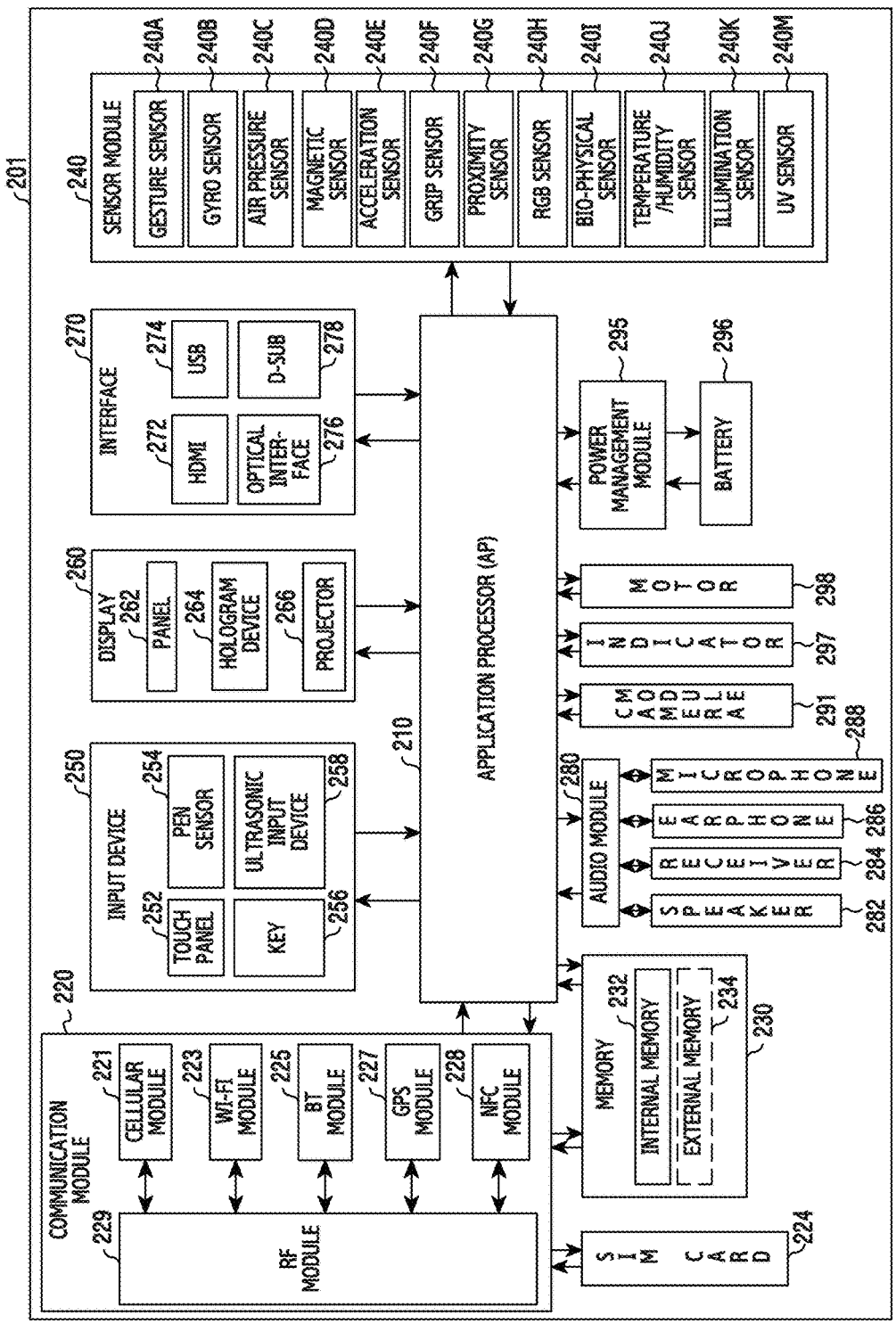
FIG. 2 is a block diagram illustrating a construction of a first electronic device according to various embodiments of the present disclosure.

FIG. 2 is a block diagram illustrating a construction of a first electronic device according to various embodiments of the present disclosure.

Referring to FIG. 2, the first electronic device 201 may include, for example, the entirety or a part of the electronic device 101 illustrated in FIG. 1, or may expand all or some elements of the electronic device 101. Referring to FIG. 2, the electronic device 201 may include at least one processor 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, or a motor 298.

At least one processor 210 may be included in the electronic device 201 to perform a specified function of the electronic device 201. According to an embodiment of the present disclosure, the processor 210 may include one or more APs and one or more MCUs. According to another embodiment of the present disclosure, the processor 210 may include one or more MCUs as applications, or may be functionally connected to one or more MCUs. In FIG. 2, the APs and the MCUs may be included in one IC package, or may be separately configured to be included in different IC packages, respectively. According to an embodiment of the present disclosure, the MCUs may be included in an IC package of the APs to be configured as one IC package together with the APs. Although the processor 210 is illustrated as including the APs or the MCUs as elements thereof, it is nothing more than an embodiment for clear understanding, and it is apparent that the processor 210 may also perform the operations of the APs and/or the MCUs.

The APs may control a plurality of hardware or software elements connected thereto and perform processing and operations on various types of data including multimedia data by driving an OS or application programs (or applications). The APs may be embodied as, for example, an SoC. According to an embodiment of the present disclosure, the processor 210 may further include a GPU (not illustrated).

The MCUs may be processors configured to perform specified operations. According to an embodiment of the present disclosure, the MCUs may acquire sensing information through one or more specified motion sensors (e.g., a gyro sensor 240B, an acceleration sensor 240E, or a geomagnetic sensor (not illustrated)), compare the acquired sensing information, and determine the respective operating states of the specified sensors (e.g., a geomagnetic sensor) with reference to a database of the electronic device 201. In addition, although the MCUs and the elements of the sensor module 240 are illustrated as separate elements in FIG. 2, the MCUs may be implemented to include at least some elements of the aforementioned sensor module 240 (e.g., at least one of the gyro sensor 240B, the acceleration sensor 240E, and the geomagnetic sensor) according to an embodiment.

According to an embodiment of the present disclosure, the APs or the MCUs may load instructions or data received from at least one of non-volatile memories or other elements connected thereto in volatile memories, and may process the loaded instructions or data. Furthermore, the APs or the MCUs may store data received from or generated by at least one of the other elements in non-volatile memories.

The communication module 220 (e.g., the communication interface 160) may perform data transmission/reception in communication between the electronic device 101 and other electronic devices (e.g., the electronic device 102 or 104, or the server 106) connected thereto through a network. According to an embodiment of the present disclosure, the communication module 220 may include a cellular module 221, a Wi-Fi module 223, a BT module 225, a GPS module 227, an NFC module 228, and a radio frequency (RF) module 229.

The cellular module 221 may provide a voice call service, a video call service, a text message service, or an Internet service through a communication network (e.g., LTE, LTE-A, CDMA, WCDMA, UMTS, WiBro, or GSM). Furthermore, the cellular module 221 may, for example, distinguish between and authenticate electronic devices within a communication network using a SIM (e.g., the SIM card 224). According to an embodiment of the present disclosure, the cellular module 221 may perform at least some of the functions that the AP 210 may provide. For example, the cellular module 221 may perform at least some of the multimedia control functions.

According to an embodiment of the present disclosure, the cellular module 221 may include a communication processor (CP). Furthermore, the cellular module 221 may be embodied as, for example, an SoC. Although the elements such as the cellular module 221 (e.g., a CP), the memory 230, and the power management module 295 are illustrated to be separate from the AP 210 in FIG. 2, the AP 210 may be implemented to include at least some of the aforementioned elements (e.g., the cellular module 221) according to an embodiment.

According to an embodiment of the present disclosure, the AP 210 or the cellular module 221 (e.g., the CP) may load instructions or data received from at least one of non-volatile memories or other elements connected thereto in volatile memories, and may process the loaded instructions or data. Furthermore, the AP 210 or the cellular module 221 may store data received from or generated by at least one of the other elements in a non-volatile memory.

The Wi-Fi module 223, the BT module 225, the GPS module 227, and the NFC module 228 may include a processor for processing data transmitted/received through the corresponding module. In FIG. 2, the cellular module 221, the Wi-Fi module 223, the BT module 225, the GPS module 227, and the NFC module 228 are illustrated as separate blocks. However, according to an embodiment of the present disclosure, at least some (e.g., two or more) of the cellular module 221, the Wi-Fi module 223, the BT module 225, the GPS module 227, and the NFC module 228 may be included in one integrated chip (IC) or one IC package. For example, at least some of the processors corresponding to the cellular module 221, the Wi-Fi module 223, the BT module 225, the GPS module 227, and the NFC module 228 (e.g., a CP corresponding to the cellular module 221 and a Wi-Fi processor corresponding to the Wi-Fi module 223) may be implemented as one SoC.

The RF module 229 may transmit/receive data, for example, RF signals. Although not illustrated, the RF module 229 may, for example, include a transceiver, a power amp module (PAM), a frequency filter, a low noise amplifier (LNA), or the like. In addition, the RF module 229 may further include an element for transmitting/receiving electronic waves over free air space in wireless communication, such as, a conductor, a conducting wire, or the like. In FIG. 2, the cellular module 221, the Wi-Fi module 223, the BT module 225, the GPS module 227, and the NFC module 228 share one RF module 229. However, according to an embodiment of the present disclosure, at least one of them may transmit/receive an RF signal through a separate RF module.

The SIM card 224 may be a card that includes a SIM, and may be inserted into a slot formed in a specific location of the electronic device. The SIM card 224 may include unique identification information (e.g., an integrated circuit card identifier (ICCID)) or subscriber information (e.g., an international mobile subscriber identity (IMSI)).

The memory 230 (e.g., the memory 130) may include an internal memory 232 or an external memory 234. The internal memory 232 may include at least one of, for example, a volatile memory (e.g., a dynamic random access memory (DRAM), a static RAM (SRAM), a synchronous dynamic RAM (SDRAM), or the like) or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, or the like).

According to an embodiment of the present disclosure, the internal memory 232 may be a solid state drive (SSD). The external memory 234 may further include a flash drive, for example, a compact flash (CF), a secure digital (SD), a micro-SD, a mini-SD, an extreme digital (xD), a Memory Stick, or the like. The external memory 234 may be functionally connected to the electronic device 201 through various interfaces. According to an embodiment of the present disclosure, the electronic device 201 may further include a storage device (or storage medium) such as a hard disc drive.

The sensor module 240 may measure a physical quantity or sense the operating state of the electronic device 201 and convert the measured or sensed information into an electric signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 240I, a temperature/humidity sensor 240J, an illumination sensor 240K, and a ultra violet (UV) sensor 240M. Additionally or alternatively, the sensor module 240 may include, for example, an E-nose sensor (not illustrated), an electromyography (EMG) sensor (not illustrated), an electroencephalogram (EEG) sensor (not illustrated), an electrocardiogram (ECG) sensor (not illustrated), an infrared (IR) sensor (not illustrated), an iris sensor (not illustrated), a fingerprint sensor (not illustrated), and the like. The sensor module 240 may further include a control circuit for controlling one or more sensors included therein.

The input device 250 may include a touch panel 252, a (digital) pen sensor 254, a key 256, or an ultrasonic input device 258. The touch panel 252 may detect a touch input using at least one of, for example, a capacitive type, a resistive type, an infrared type, and an acoustic wave type. Furthermore, the touch panel 252 may further include a control circuit. In the case of the capacitive type touch panel, physical contact or proximity detection is possible. The touch panel 252 may further include a tactile layer. In this case, the touch panel 252 may provide a user with a tactile reaction.

The (digital) pen sensor 254 may be implemented, for example, using the same or a similar method to receiving a user's touch input, or using a separate sheet for detection. The key 256 may include, for example, a physical button, an optical key, or a keypad. The ultrasonic input device 258 may identify data by sensing acoustic waves with the microphone (e.g., a microphone 288) of the electronic device 201 through an input unit used for generating ultrasonic signals and may perform a wireless detection. According to an embodiment of the present disclosure, the electronic device 201 may also receive a user input from an external device (e.g., a computer or server) connected thereto using the communication module 220. In this case, the touch panel 252 may provide a tactile response to a user.

The display 260 (e.g., the display 150) may include a panel 262, a hologram device 264, or a projector 266. The panel 262 may be, for example, a liquid crystal display (LCD), an active matrix organic light emitting diode (AM-OLED), or the like. The panel 262 may be implemented to be, for example, flexible, transparent, or wearable. The panel 262 may also be formed as a single module together with the touch panel 252. The hologram device 264 may show a three-dimensional image in the air by using interference of light. The projector 266 may display an image by projecting light onto a screen. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included in, for example, the communication interface 160 illustrated in FIG. 1. Additionally or alternatively, the interface 270 may include, for example, a mobile high-definition link (MHL) interface, a SD card/multi-media card (MMC) interface, or an infrared data association (IrDA) standard interface.

The audio module 280 may bilaterally convert a sound and an electric signal. At least some elements of the audio module 280 may be included in, for example, the I/O interface 140 illustrated in FIG. 1. The audio module 280 may process voice information input or output through, for example, a speaker 282, a receiver 284, earphones 286, or the microphone 288.

The camera module 291, which is a device for capturing both still and moving images, may include one or more image sensors (e.g., a front sensor or a rear sensor), a lens (not illustrated), an image signal processor (ISP, not illustrated), or a flash (e.g., an LED or a xenon lamp, not illustrated) according to an embodiment.

The power management module 295 may manage the power of the electronic device 201. Although not illustrated, the power management module 295 may include, for example, a power management integrated circuit (PMIC), a charger IC, or a battery or fuel gauge. According to various embodiments of the present disclosure, the PMIC may be mounted in an IC or an SoC semiconductor. Charging methods may be classified into wired charging and wireless charging. The charger IC may charge a battery and may prevent an overvoltage or excess current from being introduced from a charger.

According to an embodiment of the present disclosure, the charger IC may include a charger IC for at least one of the wired charging and the wireless charging. Examples of the wireless charging may include magnetic resonance charging, magnetic induction charging, and electromagnetic charging, and an additional circuit for wireless charging, for example, a coil loop, a resonance circuit, a rectifier or the like may be added.

The battery gauge may measure, for example, a residual quantity of the battery 296, and a voltage, a current, or a temperature while charging. The battery 296 may store or generate electricity and supply power to the electronic device 201 using the stored or generated electricity. The battery 296 may include, for example, a rechargeable battery or a solar battery.

The indicator 297 may indicate a specific state of the electronic device 201 or a part thereof (e.g., the AP 210), for example, a boot-up state, a message state, or a state of charge (SOC). A motor 298 may convert an electric signal into a mechanical vibration. Although not illustrated, the electronic device 201 may include a processing device (e.g., a GPU) for mobile TV support. The processing unit for mobile TV support may process, for example, media data pursuant to a certain standard of digital multimedia broadcasting (DMB), digital video broadcasting (DVB), or media flow.

According to an embodiment of the present disclosure, the processor 210 may connect a call with the second electronic device 102 through the BS (e.g., server 106). For example, the processor 210 may transmit or receive call data to/from the second electronic device 102 through the connected call. According to an embodiment of the present disclosure, the processor 210 may use short-range wireless communication, to transmit received call data to the third electronic device 103 or receive call data from the third electronic device 103. Or, the processor 210 may transmit the call data received from the third electronic device 103, to the second electronic device 102 through the connected call.

According to an embodiment of the present disclosure, the processor 210 may check whether a multilateral call invitation request message is received from the third electronic device 103. For example, the multilateral call invitation request message may be a message of requesting to invite the third electronic device 103 to a call between the first electronic device 101 and the second electronic device 102. For example, the multilateral call invitation request message may include unique identification information (e.g., a phone number, a unique identification number of a short-range wireless communication module (e.g., a BT module) of the third electronic device 103, or a MAC address) granted to the third electronic device 103.

If the checking result is that the multilateral call invitation request message is received from the third electronic device 103, the processor 210 may, in response to the received multilateral call invitation request message, generate a multilateral call request message and send the generated multilateral call request message to the BS. For example, the multilateral call request message may be a message of requesting to add a call between the first electronic device 101 and the third electronic device 103 to a call being currently connecting. For example, the multilateral call request message may include unique identification information of the third electronic device 103.

Figure 14:
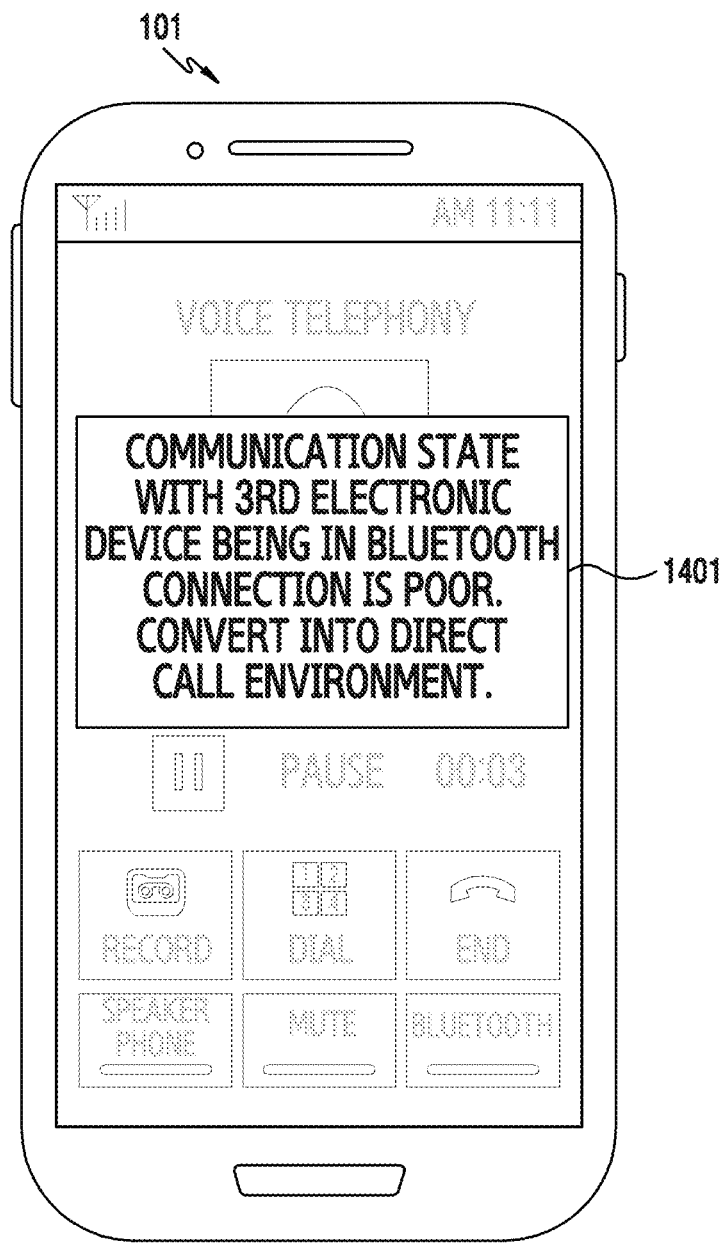
FIG. 14 is a diagram illustrating an operation of outputting a notification of a call connection between a second electronic device and a third electronic device in a first electronic device according to various embodiments of the present disclosure.

For example, if the multilateral call invitation request message is received from the third electronic device 103 or the multilateral call request message is sent to the BS, as in FIG. 14, the processor 210 may display a notification message 1401 of notifying to convert an indirect call environment between the second electronic device 102 and the third electronic device 103 into a direct call environment. For another example, the processor 210 may output the notification message 1401 by a voice through a speaker.

According to an embodiment of the present disclosure, the processor 210 may check whether a call is connected between the processor 210 and the third electronic device 103. If the checking result is that the call is connected between the processor 210 and the third electronic device 103, the processor 210 may generate a call merge request message and send the generated call merge request message to the BS. For example, the call merge request message may be a message of requesting to merge a call between the first electronic device 101 and the second electronic device 102 and a call between the first electronic device 101 and the third electronic device 103.

According to an embodiment of the present disclosure, the processor 210 may check whether an individual call between the first electronic device 101 and the second electronic device 102 and an individual call between the first electronic device 101 and the third electronic device 103 are merged with each other. If the checking result is that the calls are merged with each other, the processor 210 may generate a call connection release message and send the generated call connection release message to the BS. For example, the call connection release message may be a message of requesting a release of a call connection.

According to an embodiment of the present disclosure, in response to a call connection release message, the processor 210 may release a call of the first electronic device 101 from the merged calls, so as to directly connect a call between the second electronic device 102 and the third electronic device 103.

Each of the above-described elements of the electronic device according to various embodiments of the present disclosure may include one or more components, and the name of a corresponding element may vary according to the type of electronic device. The electronic device according to various embodiments of the present disclosure may include at least one of the above-described elements and may exclude some of the elements or further include other additional elements. Further, some of the elements of the electronic device according to various embodiments of the present disclosure may be coupled to form a single entity while performing the same functions as those of the corresponding elements before the coupling.

Figure 3:
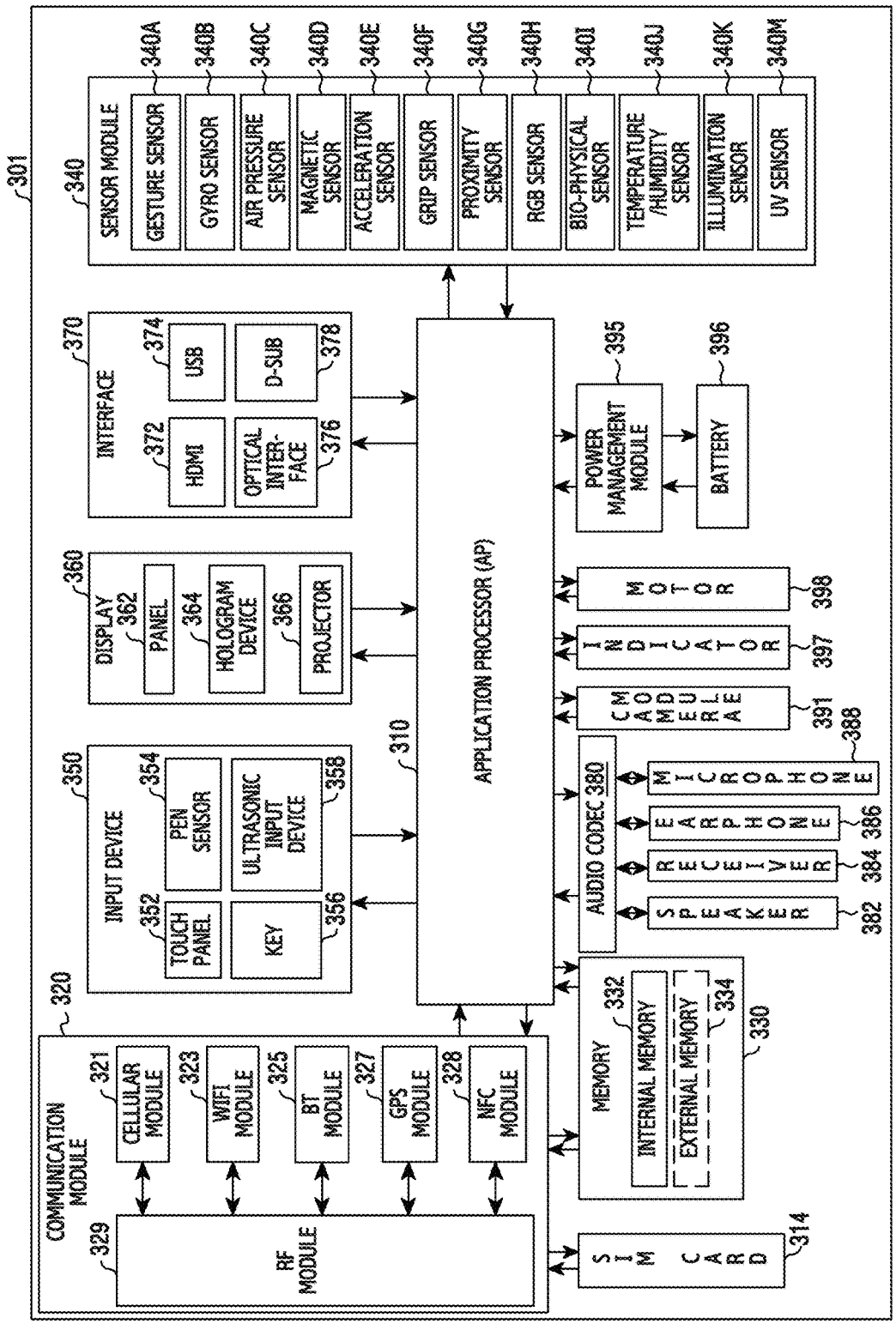
FIG. 3 is a block diagram illustrating a construction of a third electronic device according to various embodiments of the present disclosure.

FIG. 3 is a block diagram illustrating a construction of a third electronic device according to various embodiments of the present disclosure.

Referring to FIG. 3, the third electronic device 301 may, for example, include all or some of the third electronic device 103 illustrated in FIG. 1, or may extend a construction of all or some of the third electronic device 103. Referring to FIG. 3, the third electronic device 301 may include at least one processor 310, a communication module 320, an SIM card 324, a memory 330, a sensor module 340, an input device 350, a display 360, an interface 370, an audio codec 380, a camera module 391, a power management module 395, a battery 396, an indicator 397, and a motor 398.

In an embodiment of the present disclosure, the constituent elements (e.g., the at least one processor 310, the communication module 320 (including communication modules 321-329), the SIM card 314, the memory 330 (including memories 332-334), the sensor module 340 (including sensors 340A-M), the input device 350 (including input devices 352-358), the display 360 (including displays 362-366), the interface 370 (including interfaces 372-378), the audio codec 380 (including components 382-388), the camera module 391, the power management module 395, the battery 396, the indicator 397, and the motor 398) of FIG. 3 may correspond to the constituent elements (e.g., the at least one processor 210, the communication module 220, the SIM card 224, the memory 230, the sensor module 240, the input device 250, the display 260, the interface 270, the audio module 280, the camera module 291, the power management module 295, the battery 296, the indicator 297, and the motor 298) of FIG. 2. Therefore, a detailed description of the constituent elements of FIG. 3 is omitted.

According to an embodiment of the present disclosure, the processor 310 may convert a communication mode into a short-range wireless communication mode or maintain the short-range wireless communication mode. For example, the processor 310 may connect a communication with the first electronic device 101 using short-range wireless communication.

According to an embodiment of the present disclosure, the processor 310 may use short-range wireless communication to receive call data from the first electronic device 101 or transmit call data to the first electronic device 101. For example, the processor 310 may receive call data between the first electronic device 101 and the second electronic device 102, convert the received call data into a voice signal, and output the voice signal through a speaker. For another example, the processor 310 may receive a voice signal through a microphone, convert the received voice signal into call data, and transmit the call data to the first electronic device 101.

According to an embodiment of the present disclosure, the processor 310 may check a communication state (or a communication connection state) of short-range wireless communication. For example, the processor 310 may check whether the communication state of the short-range wireless communication is abnormal based on a signal strength of received call data, a data rate, a data error rate, or communication connection release or non-release.

For example, the processor 310 may measure a signal strength of call data. If the measured signal strength of the call data is less than a predesignated reference value, the processor 310 may determine that the communication state of the short-range wireless communication is abnormal. Unlike this, if the measured signal strength of the call data is equal to or is greater than the reference value, the processor 310 may determine that the communication state of the short-range wireless communication is normal. For another example, the processor 310 may determine the number of cases in which the measured signal strength of the call data is less than the reference value during a predesignated time. If the determined number is equal to or is greater than a reference value, the processor 310 may determine that the communication state of the short-range wireless communication is abnormal. Unlike this, if the determined number is less than the reference value, the processor 310 may determine that the communication state of the short-range wireless communication is normal.

For further example, if a connection of short-range wireless communication with the first electronic device 101 is released compulsorily, the processor 310 may determine that the communication state of the short-range wireless communication is abnormal. Unlike this, if the connection of the short-range wireless communication with the first electronic device 101 is maintained, the processor 310 may determine that the communication state of the short-range wireless communication is normal.

In accordance with an embodiment of the present disclosure, if it is sensed that a communication state of short-range wireless communication is abnormal, the processor 310 may generate a multilateral call invitation request message, and send the generated multilateral call invitation request message to the first electronic device 101 using the short-range wireless communication. And, to communicate with the BS, the processor 310 may convert a communication mode from a short-range wireless communication mode to a cellular communication mode. For example, if the multilateral call invitation request message is sent to the first electronic device 101 or the communication mode is converted into the cellular communication mode, the processor 310 may, as in FIG. 15, display a notification message 1501 of notifying to convert an indirect call environment between the second electronic device 102 and the third electronic device 103 into a direct call environment. For another example, the processor 310 may output the notification message 1501 by a voice through a speaker.

According to an embodiment of the present disclosure, the processor 310 may check whether a call connection request message is received from the BS (e.g., server 106). If the checking result is that the call connection request message is received, the processor 310 may display a call connection inquiry message of inquiring of a user whether to connect a call or not.

And, the processor 310 may receive a response including call connection acceptance or non-acceptance from the user. For example, if the received response is a call connection acceptance, the processor 310 may generate a call connection response message including information representing the call connection acceptance and send the generated call connection response message to the BS. For another example, if the received response is a call connection denial, the processor 310 may generate a call connection response message including information representing the call connection denial and send the generated call connection response message to the BS.

According to an embodiment of the present disclosure, the processor 310 may check that a call is connected between the first electronic device 101 and the third electronic device 103. And, the processor 310 may check that an individual call between the first electronic device 101 and the third electronic device 103 and an individual call between the first electronic device 101 and the second electronic device 102 are merged with each other. The processor 310 may also check that the call between the first electronic device 101 and the third electronic device 103 is released from the merged calls, so as to directly connect a call between the second electronic device 102 and the third electronic device 103.

According to an embodiment of the present disclosure, the second electronic device 102 may include the constituent elements illustrated in FIG. 3. For example, the second electronic device 102 may include the at least one processor 310, the communication module 320, the SIM card 324, the memory 330, the sensor module 340, the input device 350, the display 360, the interface 370, the audio codec 380, the camera module 391, the power management module 395, the battery 396, the indicator 397, and the motor 398.

According to an embodiment of the present disclosure, the processor 310 of the second electronic device 102 may connect a call between the first electronic device 101 and the second electronic device 102 through the BS. For example, the processor 310 may transmit or receive call data to/from the first electronic device 101 through the connected call. According to an embodiment of the present disclosure, the processor 310 may check that an individual call between the first electronic device 101 and the second electronic device 102 and an individual call between the first electronic device 101 and the third electronic device 103 are merged with each other. According to an embodiment of the present disclosure, the processor 310 may check that the call between the first electronic device 101 and the third electronic device 103 is released from the merged calls, so as to directly connect a call between the second electronic device 102 and the third electronic device 103.

Figure 4:
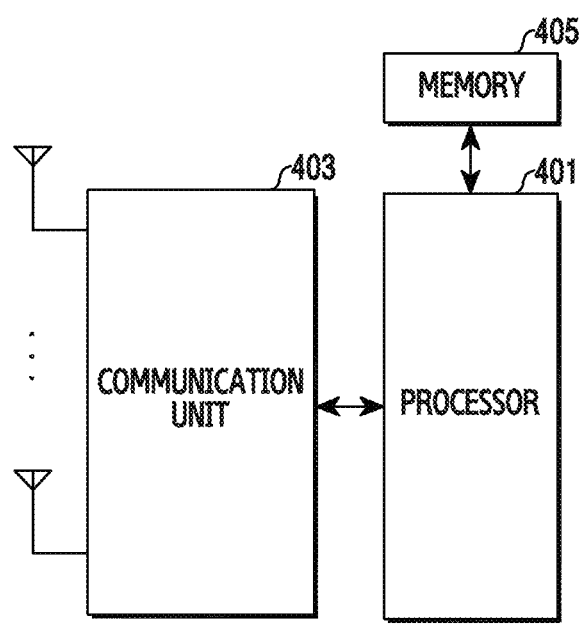
FIG. 4 is a block diagram illustrating a construction of a base station according to various embodiments of the present disclosure.

FIG. 4 is a block diagram illustrating a construction of a BS according to various embodiments of the present disclosure.

Referring to FIG. 4, the BS (e.g., the server 106) may include a processor 401, a communication unit 403, and a memory 405.

In a description of each constituent element, the communication unit 403 may support a cellular communication mode, and transmit or receive a signal to/from at least one electronic device within a cell. For example, the communication unit 403 may transmit or receive a signal to/from the first electronic device 101 or the third electronic device 103. For example, the communication unit 403 may include an RF processor and a baseband processor. The RF processor performs a function for transmitting/receiving a signal through a wireless channel, such as signal band conversion, amplification, etc. That is, the RF processor up converts a baseband signal provided from the baseband processor into an RF band signal and then transmits the RF band signal through an antenna, and down converts an RF band signal received through the antenna into a baseband signal. For example, the RF processor may include a transmission filter, a reception filter, an amplifier, a mixer, an oscillator, a digital to analog converter (DAC), an analog to digital converter (ADC), etc. And, the RF processor may include a plurality of RF chains. Also, the RF processor may perform beamforming. For the sake of the beamforming, the RF processor may adjust a phase and magnitude of each of signals transmitted/received through a plurality of antennas or antenna elements.

The baseband processor performs a function of conversion between a baseband signal and a bit stream according to the physical layer standard of a system. For example, at data transmission, the baseband processor encodes and modulates a transmission bit stream, thereby generating complex symbols. And, at data reception, the baseband processor restores a reception bit stream by demodulating and decoding a baseband signal provided from the RF processor. For example, according to an orthogonal frequency-division multiplexing (OFDM) scheme, at data transmission, the baseband processor encodes and modulates a transmission bit stream, thereby generating complex symbols, maps the complex symbols to subcarriers, and then constructs OFDM symbols through inverse fast fourier transform (IFFT) operation and cyclic prefix (CP) insertion. Also, at data reception, the baseband processor divides a baseband signal provided from the RF processor by the unit of OFDM symbol, restores signals mapped to subcarriers through FFT operation, and restores a reception bit stream through demodulation and decoding. As described above, the baseband processor and the RF processor transmit or receive a signal to/from the first electronic device 101 or the third electronic device 103. Accordingly to this, the communication unit 403 may be denoted as a transmission unit, a reception unit, a transmission/reception unit or a wireless communication unit.

The memory 405 may store a basic program for an operation of the BS, an application program, data such as setting information, etc. The processor 401 controls general operations of the BS. For example, the processor 401 may transmit/receive a signal through the communication unit 403. And, the processor 401 may record or read data in/from the memory 405.

In accordance with an embodiment of the present disclosure, the processor 401 may connect a call between the first electronic device 101 and the second electronic device 102. For example, the processor 401 may transmit/receive communication data between the first electronic device 101 and the second electronic device 102 through the call.

According to an embodiment of the present disclosure, the processor 401 may check whether a multilateral call request message is received from the first electronic device 101. If the checking result is that the multilateral call request message is received from the first electronic device 101, the first electronic device 101 may generate a call connection request message and send the call connection request message to the third electronic device 103. For example, the call connection request message may be a message of requesting a call connection between the first electronic device 101 and the third electronic device 103. At this time, the third electronic device 103 may communicate with the BS (e.g., server 106) using cellular communication in which a communication mode is a cellular communication mode.

According to an embodiment of the present disclosure, the processor 401 may check whether it receives a call connection response message from the third electronic device 103. If the checking result is that the call connection response message is received, the processor 401 may check whether a call connection between the first electronic device 101 and the third electronic device 103 is accepted, based on the received call connection response message. For example, if the call connection response message includes information representing a denial of the call connection, the processor 401 may determine that the third electronic device 103 denies the call connection. For another example, if the call connection response message includes information representing an acceptance of the call connection, the processor 401 may determine that the third electronic device 103 accepts the call connection.

According to an embodiment of the present disclosure, if a call connection between the first electronic device 101 and the third electronic device 103 is denied, the processor 401 may end an attempt of the call connection between the first electronic device 101 and the third electronic device 103. According to another embodiment of the present disclosure, if the call connection is accepted, the processor 401 may connect a call between the first electronic device 101 and the third electronic device 103. According to an embodiment of the present disclosure, the processor 401 may check whether a call merge request message is received from the first electronic device 101. If the checking result is that the call merge request message is received, the processor 401 may merge an individual call between the first electronic device 101 and the second electronic device 102 and an individual call between the first electronic device 101 and the third electronic device 103.

According to an embodiment of the present disclosure, the processor 401 may check whether a call connection release message is received from the first electronic device 101. If the checking result is that the call connection release message is received, the processor 401 may release a call of the first electronic device 101 from merged calls, so as to directly connect a call between the second electronic device 102 and the third electronic device 103.

Figure 5:
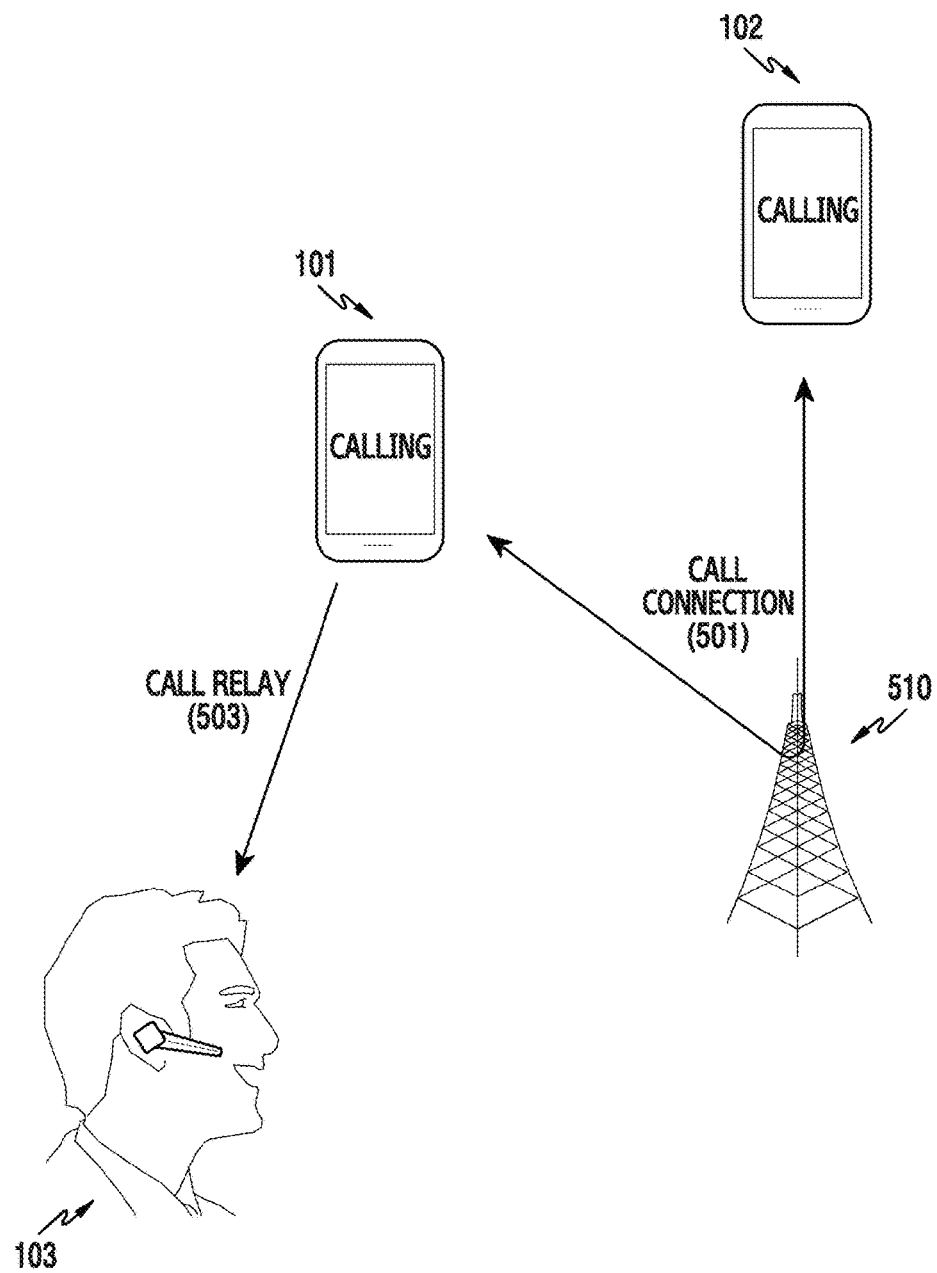
FIG. 5 is a diagram illustrating an operation of relaying call data with a second electronic device, to a third electronic device in a first electronic device according to various embodiments of the present disclosure.

FIG. 5 is a diagram illustrating an operation of relaying call data with a second electronic device, to a third electronic device in a first electronic device according to various embodiments of the present disclosure.

Referring to FIG. 5, the first electronic device 101 may receive call data (e.g., voice data or multimedia data including the voice data and picture data) from the second electronic device 102 using cellular communication, and transmit the received call data to the third electronic device 103 using short-range wireless communication. For example, the first electronic device 101 use the cellular communication to connect (501) a call with the second electronic device 102 through the BS 510 and transmit/receive call data with the second electronic device 102 through the connected call. And, the first electronic device 101 may transmit call data received from the second electronic device 102 to the third electronic device 103, using the short-range wireless communication, or transmit call data received from the third electronic device 103 to the second electronic device 102, using the cellular communication (e.g., call relay 503).

According to an embodiment of the present disclosure, the third electronic device 103 may receive call data from the first electronic device 101 using short-range wireless communication, and output the received call data through the speaker (e.g., 382) of the third electronic device 103. For example, the third electronic device 103 may receive call data through the microphone (e.g., 388) of the third electronic device 103, and transmit the received call data to the first electronic device 101 using the short-range wireless communication.

According to an embodiment of the present disclosure, the first electronic device 101 may be a communication device such as a smartphone, which performs communication with the second electronic device 102 (e.g., a smartphone) using cellular communication, and performs communication with the third electronic device 103 using short-range wireless communication. According to an embodiment of the present disclosure, the third electronic device 103 may be an assistant communication device such as a wireless headphone (or a device including a speaker like a wireless hearing aid and a wireless earphone) and a wireless headset (or a device including a microphone and a speaker like a wireless ear set), which performs communication with the first electronic device 101 using the short-range wireless communication and performs communication with the first or second electronic device 101 or 102 using the cellular communication.

According to an embodiment of the present disclosure, short-range wireless communication may include at least one of WiFi communication, BT communication, Bluetooth low energy (BLE) communication, and NFC communication. According to an embodiment of the present disclosure, the cellular communication may include at least one communication among LTE, LTE-A, CDMA, WCDMA, UMTS, WiBro or GSM, etc.

According to an embodiment of the present disclosure, the third electronic device 103 may be a wearable device (e.g., a smartwatch, a smart band, a smart necklace, etc.) including a speaker and a microphone and being wearable on a part of the user's body. According to an embodiment of the present disclosure, the third electronic device 103 may be connected with an assistant device including at least one of a speaker and a microphone. For example, the third electronic device 103 may output call data received from the first electronic device 101, to a user through a speaker of a connected assistant device. For another example, the third electronic device 103 may receive a voice signal from the user through a microphone of the connected assistant device.

For example, the third electronic device 103 may be connected with an earphone, or an earphone equipped with a microphone, and output a voice signal received from the first electronic device 101 through the connected earphone or earphone equipped with the microphone. For example, in case that the third electronic device 103 is connected with an earphone including a microphone, the third electronic device 103 may receive an external audio signal through the connected microphone.

The aforementioned description has been made in which the third electronic device 103 is a device wearable on the user's body, but the present disclosure is not limited to this.

Figure 6:
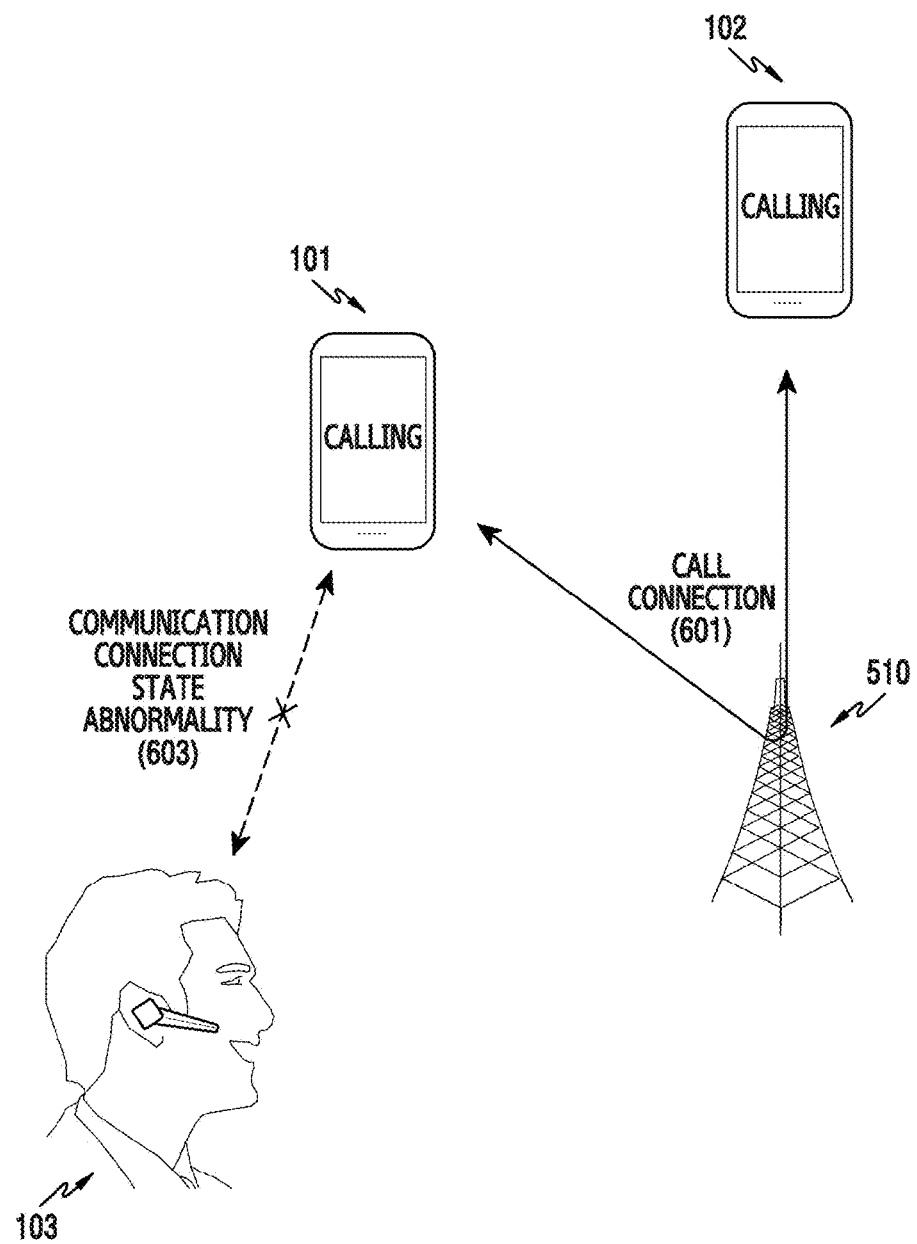
FIG. 6 is a diagram illustrating an operation of sensing a state abnormality of short-range wireless communication in a third electronic device according to various embodiments of the present disclosure.

FIG. 6 is a diagram illustrating an operation of sensing a state abnormality of short-range wireless communication in a third electronic device according to various embodiments of the present disclosure.

Referring to FIG. 6, the first electronic device 101 may connect (601) a call with the second electronic device 102 through the BS 510 using cellular communication and receive call data from the second electronic device 102 through the connected call, and transmit the received call data to the third electronic device 103 using short-range wireless communication. And, the third electronic device 103 may receive call data from the first electronic device 101, and output the received call data through the earphone 386 of the third electronic device 103.

According to an embodiment of the present disclosure, the third electronic device 103 may check a communication state (or a communication connection state) of short-range wireless communication between the first electronic device 101 and the third electronic device 103. For example, the third electronic device 103 may check the communication state of the short-range wireless communication based on a signal strength of received call data, a data rate, a data error rate, or communication connection release or non-release (e.g., communication connection state abnormality 603).

For example, the third electronic device 103 may measure a signal strength of call data. If the measured signal strength of the call data is less than a predesignated reference value, the third electronic device 103 may determine that the communication state of the short-range wireless communication is abnormal. Unlike this, if the measured signal strength of the call data is equal to or is greater than the reference value, the third electronic device 103 may determine that the communication state of the short-range wireless communication is normal. For another example, the third electronic device 103 may determine the number of cases in which the measured signal strength of the call data is less than the reference value during a predesignated time. If the determined number is equal to or is greater than a reference value, the third electronic device 103 may determine that the communication state of the short-range wireless communication is abnormal. Unlike this, if the determined number is less than the reference value, the third electronic device 103 may determine that the communication state of the short-range wireless communication is normal.

For further example, if a connection of short-range wireless communication with the first electronic device 101 is released compulsorily, the third electronic device 103 may determine that the communication state of the short-range wireless communication is abnormal. Unlike this, if the connection of the short-range wireless communication with the first electronic device 101 is maintained, the third electronic device 103 may determine that the communication state of the short-range wireless communication is normal.

Figure 7:
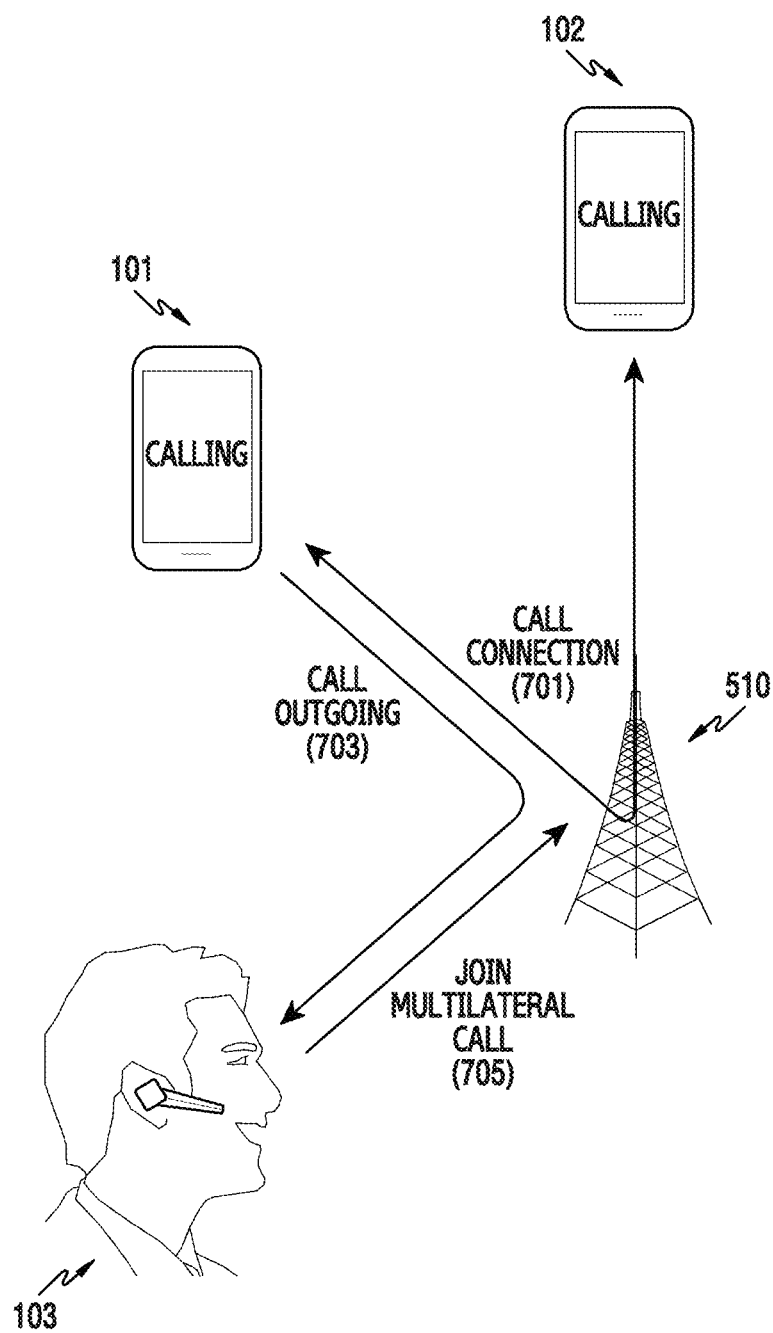
FIG. 7 is a diagram illustrating an operation of building a multilateral call environment in a first electronic device according to various embodiments of the present disclosure.

FIG. 7 is a diagram illustrating an operation of building a multilateral call environment in a first electronic device according to various embodiments of the present disclosure.

Referring to FIG. 7, the first electronic device 101 may connect (701) a call with the second electronic device 102 through the BS 510 using cellular communication, and receive call data from the second electronic device 102 through the connected call. And, if a state abnormality of short-range wireless communication takes place, the third electronic device 103 may send a multilateral call invitation request message to the first electronic device 101, and convert a communication mode from a short-range wireless communication mode into a cellular communication mode. For example, the multilateral call invitation request message may be a message of requesting to invite the third electronic device 103 to a call between the first electronic device 101 and the second electronic device 102. For example, the multilateral call invitation request message may include unique identification information (e.g., a phone number, a unique identification number of the short-range wireless communication module (e.g., a BT module) of the third electronic device 103, or a MAC address) granted to the third electronic device 103.

According to an embodiment of the present disclosure, if a multilateral call invitation request message is received from the third electronic device 103, the first electronic device 101 may send (703) a call to the third electronic device 103 through the BS 510 using cellular communication. For example, if the multilateral call invitation request message is received from the third electronic device 103, the first electronic device 101 may send a multilateral call request message to the BS 510. For example, the multilateral call request message may be a message of requesting to add a call between the first electronic device 101 and the third electronic device 103 to a call being currently connecting. For example, the multilateral call request message may include unique identification information of the third electronic device 103.

For example, if the multilateral call request message is received from the first electronic device 101, the BS 510 may send a call connection request message to the third electronic device 103 using cellular communication. For example, the call connection request message may be a message of requesting a call connection between the first electronic device 101 and the third electronic device 103.

According to an embodiment of the present disclosure, if a call connection request message is received from the BS 510, the third electronic device 103 may connect a call between the first electronic device 101 and the third electronic device 103 through the BS 510, thereby joining (705) a multilateral call. For example, if the call connection request message is received from the BS 510, the third electronic device 103 may output a message of inquiring of a user whether to connect a call or not, and receive a response to the outputted message from the user. For example, the message may be outputted using an audio, a pop-up window, a vibration, or a combination thereof.

And, based on the response received from the user, the third electronic device 103 may generate a call connection response message, and send the call connection response message to the BS 510. For example, in case that the received response is a denial of a call connection, the third electronic device 103 may send the BS 510 a call connection response message including information representing the denial of the call connection. For another example, in case that the received response is an acceptance of the call connection, the third electronic device 103 may send the BS 510 a call connection response message including information representing the acceptance of the call connection.

For example, if a call connection response message is received from the third electronic device 103, the BS 510 may connect a call between the first electronic device 101 and the third electronic device 103 based on the call connection response message. For example, in case that the call connection response message includes information representing a denial of a call connection, the BS 510 may not connect the call between the first electronic device 101 and the third electronic device 103. For another example, in case that the call connection response message includes information representing an acceptance of the call connection, the BS 510 may connect the call between the first electronic device 101 and the third electronic device 103.

For example, if the call between the first electronic device 101 and the third electronic device 103 is established, the first electronic device 101 may generate a call merge request message and send the generated call merge request message to the BS 510. For example, the call merge request message may be a message of requesting to merge a call between the first electronic device 101 and the second electronic device 102 and the call between the first electronic device 101 and the third electronic device 103. For example, if the call merge request message is received from the first electronic device 101, the base station 510 may merge the call between the first electronic device 101 and the second electronic device 102 and the call between the first electronic device 101 and the third electronic device 103.

Through these operations, the first electronic device 101 may build a multilateral call environment (or a multiple call environment) in which three or more electronic devices (e.g., the first to third electronic devices 101, 102, and 103) can transmit/receive call data through a merged call (e.g., one communication line).

According to an embodiment of the present disclosure, in case that a multilateral call invitation request message does not include unique identification information of the third electronic device 103, the first electronic device 101 may check the unique identification information (e.g., phone number) of the third electronic device 103 previously stored in the memory 130 of the first electronic device 101. For example, the first electronic device 101 may check device identification information (e.g., a MAC address) about a short-range wireless communication module (e.g., a BT communication module) of the third electronic device 103 being in short-range wireless communication connection with the first electronic device 101, and detect the unique identification information (e.g., phone number) of the third electronic device 103 corresponding to the checked device identification information from the memory 103. Thereafter, the first electronic device 101 may generate a multilateral call request message including the detected unique identification information of the third electronic device 103.

According to an embodiment of the present disclosure, when building a multilateral call environment, the BS 510 may convert a communication line connected earlier (e.g., connected between the first electronic device 101 and the second electronic device 102 through the BS 510) into a communication line suitable to the multilateral call environment, or construct a new communication line suitable to the multilateral call environment and assign the new communication line to the first to third electronic devices 101, 102, and 103.

According to various embodiments of the present disclosure, in case that abnormality takes place in a short-range wireless communication connection state of the third electronic device 103, the first electronic device 101 may build a multilateral call environment.

According to various embodiments of the present disclosure, when the first electronic device 101 sends a call to the third electronic device 103 through the BS 510, the first electronic device 101 may send the third electronic device 103 a message of requesting to turn on a power source of a cellular communication module of the third electronic device 103. For example, the cellular communication module may be a communication module supporting cellular communication.

For example, when the first electronic device 101 sends a request for call outgoing of the third electronic device 103 to the base station 510 using cellular communication, the power source of the cellular communication module of the third electronic device 103 may be off. In case that the power source of the cellular communication module of the third electronic device 103 is off as such, the third electronic device 103 may not receive a call from the BS 510. To prevent this, the first electronic device 101 may use short-range communication to send the third electronic device 103 a communication module activation request message of requesting to turn on the power source of the cellular communication module of the third electronic device 103. For example, the first electronic device 101 may send the call outgoing request to the BS 510 after sending the communication module activation request message to the third electronic device 103. For another example, the first electronic device 101 may send the communication module activation request message to the third electronic device 103 when a response to the call outgoing request is not received from the BS 510 during a predesignated time after sending the call outgoing request to the BS 510.

Figure 8:
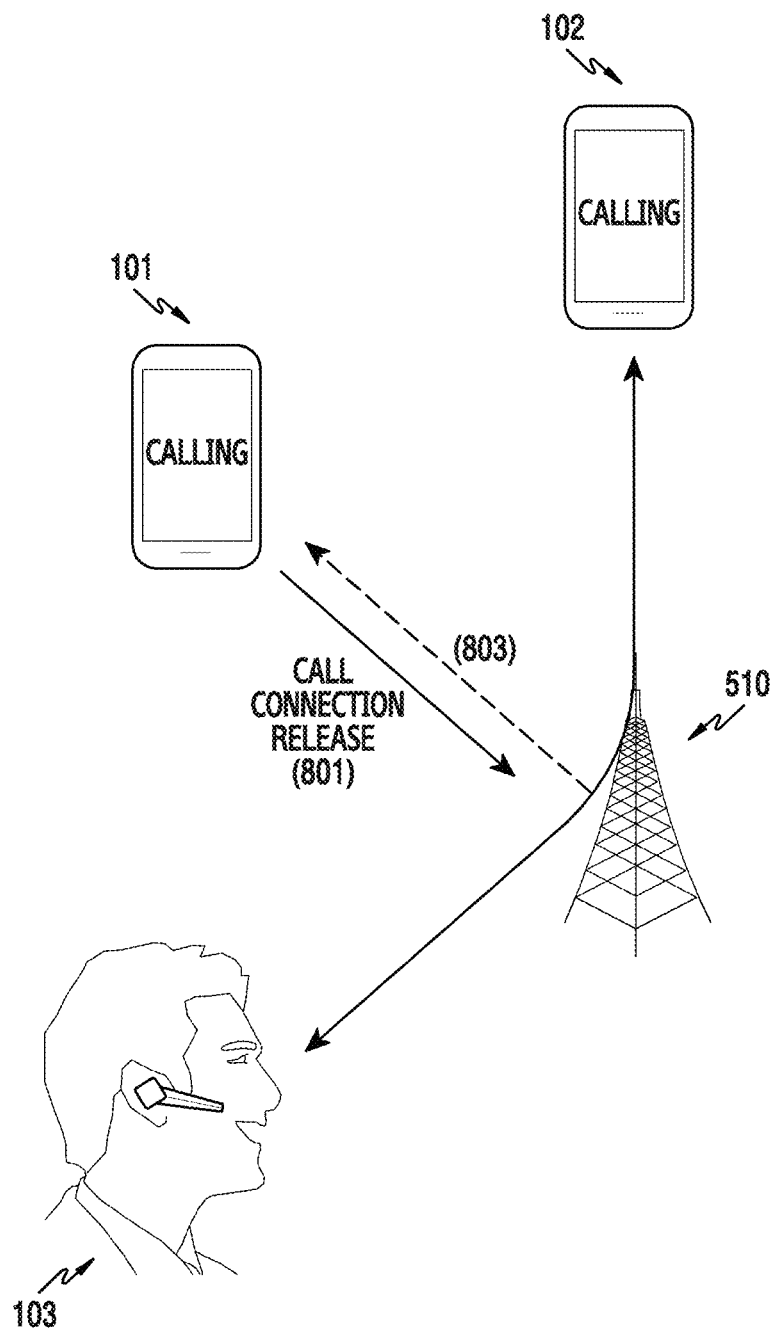
FIG. 8 is a diagram illustrating an operation of releasing a call connection in a first electronic device according to various embodiments of the present disclosure.

FIG. 8 is a diagram illustrating an operation of releasing a call connection in a first electronic device according to various embodiments of the present disclosure.

Referring to FIG. 8, if it is checked that a multilateral call environment is built, the first electronic device 101 may maintain a call between the second electronic device 102 and the third electronic device 103 by ending a call of the first electronic device 101 in the multilateral call environment.

For example, if calls are merged with each other, the first electronic device 101 may generate a call connection release message and send (801) the generated call connection release message to the BS 510. For example, the call connection release message may be a message of requesting a release of a call connection. For example, if the call connection release message is received from the first electronic device 101, the BS 510 may release (803) a call connection of the first electronic device 101 from the merged calls, and maintain a call connection between the second electronic device 102 and the third electronic device 103.

Through this operation, the multilateral call environment that the first to third electronic devices 101, 102, and 103 are joining may be changed into a point-to-point communication environment between the second electronic device 102 and the third electronic device 103.

Figure 9:
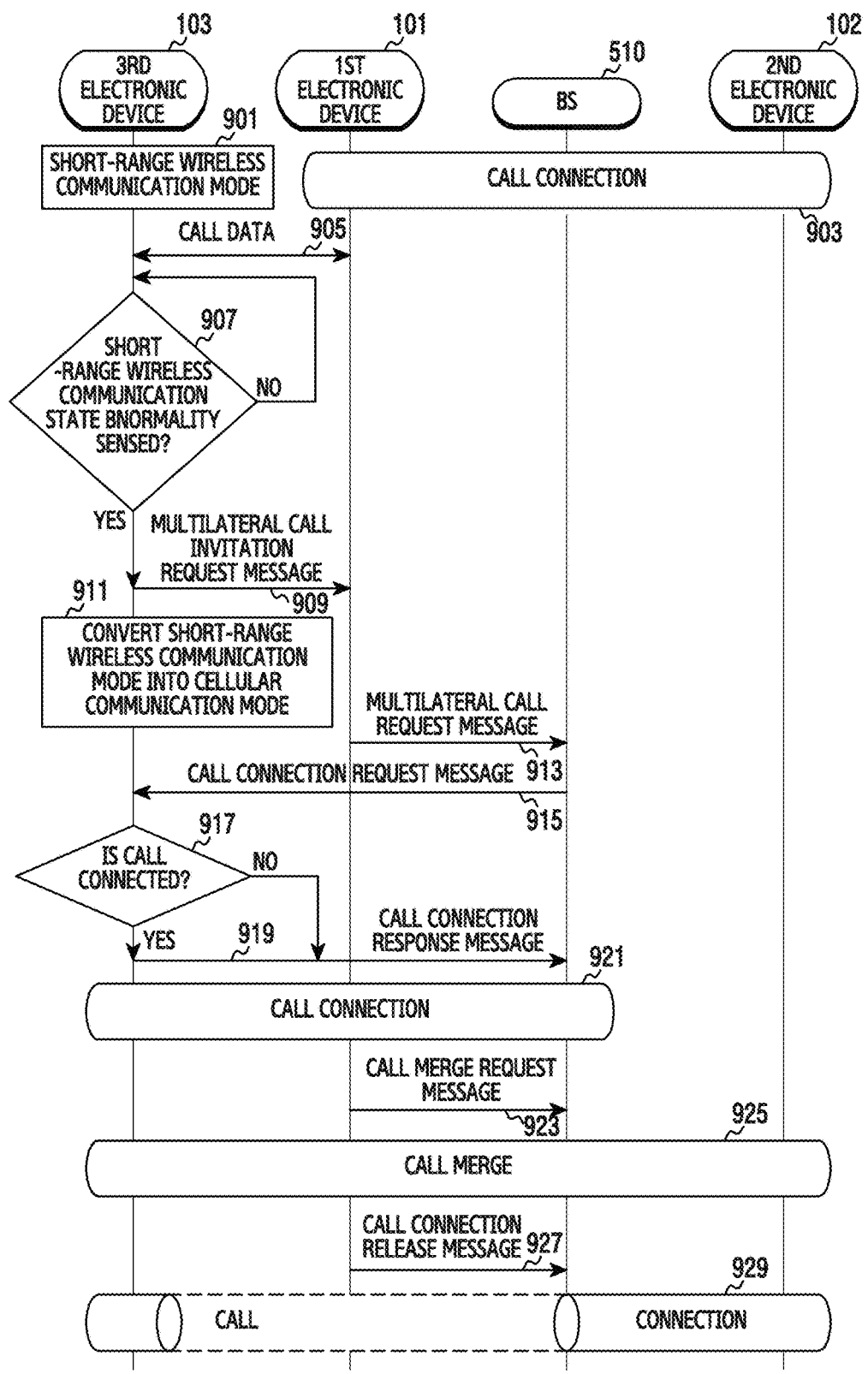
FIG. 9 is a ladder diagram illustrating an operation of connecting a call between a second electronic device and a third electronic device in a network environment according to various embodiments of the present disclosure.

FIG. 9 is a ladder diagram illustrating an operation of connecting a call between a second electronic device and a third electronic device in a network environment according to various embodiments of the present disclosure.

Referring to FIG. 9, in operation 901, the third electronic device 103 may convert a communication mode into a short-range wireless communication mode or maintain the short-range wireless communication mode. For example, the short-range wireless communication mode may represent a communication mode supporting short-range wireless communication. For example, the short-range wireless communication mode may be called various names in accordance with the kind of the short-range wireless communication. For example, if the short-range wireless communication is BT, the short-range wireless communication mode may become a BT communication mode. For another example, if the short-range wireless communication is Zigbee, the short-range wireless communication mode may be a Zigbee communication mode.

In operation 903, the first electronic device 101 may use cellular communication to connect a call with the second electronic device 102 through the BS 510, and transmit or receive call data to/from the second electronic device 102 through the connected call. For example, the call data may be voice data, or multimedia data including the voice data or picture data. In operation 905, the first electronic device 101 may use short-range wireless communication to transmit the received call data to the third electronic device 103 or receive call data from the third electronic device 103. Or, the first electronic device 101 may transmit the call data received from the third electronic device 103, to the second electronic device 102 through the connected call.

In operation 907, the third electronic device 103 may check a communication state (or a communication connection state) of the short-range wireless communication. For example, the third electronic device 103 may check whether the communication state of the short-range wireless communication is abnormal based on a signal strength of the received call data, a data rate, a data error rate, or communication connection release or non-release. If it is sensed that the communication state of the short-range wireless communication is abnormal as the checking result, the third electronic device 103 may proceed to operation 909 and otherwise, may repeatedly perform operation 907.

In operation 909, the third electronic device 103 may generate a multilateral call invitation request message and send the generated multilateral call invitation request message to the first electronic device 101. For example, the third electronic device 103 may send the multilateral call invitation request message using the short-range wireless communication. For example, the multilateral call invitation request message may be a message of requesting to invite the third electronic device 103 to a call between the first electronic device 101 and the second electronic device 102. For example, the multilateral call invitation request message may include unique identification information (e.g., a phone number, a unique identification number of a short-range wireless communication module (e.g., a BT module) of the third electronic device 103, or a MAC address) granted to the third electronic device 103.

After sending the multilateral call invitation request message, in operation 911, the third electronic device 103 may convert the communication mode from the short-range wireless communication mode to a cellular communication mode. For example, the cellular communication mode may refer to a mode of supporting cellular communication for communicating with the BS 510. For example, the third electronic device 103 may turn on a power source of a cellular communication module of the third electronic device 103 and turn off a power source of a short-range wireless communication module of the third electronic device 103, thereby converting the communication mode from the short-range wireless communication mode to the cellular communication mode.

In operation 913, the first electronic device 101 may generate a multilateral call request message, and send the generated multilateral call request message to the BS 510 using the cellular communication. Since the first electronic device 101 is already making a call with the second electronic device 102 through the BS 510 using the cellular communication, there is no need to activate the cellular communication mode. For example, the multilateral call request message may be a message of requesting to add a call between the first electronic device 101 and the third electronic device 103 to a call being currently connecting. For example, the multilateral call request message may include unique identification information of the third electronic device 103.

In operation 915, the BS 510 may send a call connection request message to the third electronic device 103 using the cellular communication. For example, the call connection request message may be a message of requesting a call connection between the first electronic device 101 and the third electronic device 103.

In operation 917, the third electronic device 103 may receive a response about a denial or acceptance of the call connection from a user. For example, if the call connection request message is received from the BS 510, the third electronic device 103 may output a call connection inquiry message of inquiring whether to connect a call or not, and receive a response to the outputted message from the user. For example, the message may be outputted using an audio, a pop-up window, a vibration or a combination thereof.

In operation 919, the third electronic device 103 may generate a call connection response message based on the response received from the user, and send the generated call connection response message to the BS 510. For example, if the received response is the denial of the call connection, the third electronic device 103 may send the BS 510 a call connection response message including information representing the denial of the call connection. For another example, if the received response is the acceptance of the call connection, the third electronic device 103 may send the BS 510 a call connection response message including information representing the acceptance of the call connection.

In operation 921, based on the call connection response message, the BS 510 may connect the call between the first electronic device 101 and the third electronic device 103. For example, in case that the call connection response message includes information representing the denial of the call connection, the BS 510 may not connect the call between the first electronic device 101 and the third electronic device 103. For another example, in case that the call connection response message includes information representing the acceptance of the call connection, the BS 510 may connect the call between the first electronic device 101 and the third electronic device 103.

In operation 923, if the call between the first electronic device 101 and the third electronic device 103 is connected, the first electronic device 101 may generate a call merge request message and send the generated call merge request message to the BS 510. For example, the call merge request message may be a message of requesting to merge the call between the first electronic device 101 and the second electronic device 102 and the call between the first electronic device 101 and the third electronic device 103.

In operation 925, the BS 510 may merge an individual call between the first electronic device 101 and the second electronic device 102 and an individual call between the first electronic device 101 and the third electronic device 103, into one call. For example, if the calls are merged with each other, the BS 510 may send the first electronic device 101 a call merge response message of notifying the merging of the calls such that the first electronic device 101 may check the merging of the calls. For example, the BS 510 may send the second electronic device 102 or the third electronic device 103 the call merge notification message of notifying the merging of the calls such that the second electronic device 102 or the third electronic device 103 may check the merging of the calls.

If the merging of the calls is checked, in operation 927, the first electronic device 101 may generate a call connection release message and send the generated call connection release message to the BS 510. For example, the call connection release message may be a message of requesting a release of a call connection. For example, if receiving the call merge response message from the BS 510, the first electronic device 101 may determine that the calls are merged with each other. In operation 929, the BS 510 may release the call connection of the first electronic device 101 from the merged calls so as to directly connect a call between the second electronic device 102 and the third electronic device 103.

Through this operation, if abnormality occurs in short-range wireless communication while the third electronic device 103 connected with the first electronic device 101 provides a user with call data between the first electronic device 101 and the second electronic device 102 using the short-range wireless communication, the third electronic device 103 may automatically and directly connect a call with the second electronic device 102, thereby seamlessly providing a call to the user.

Figure 10:
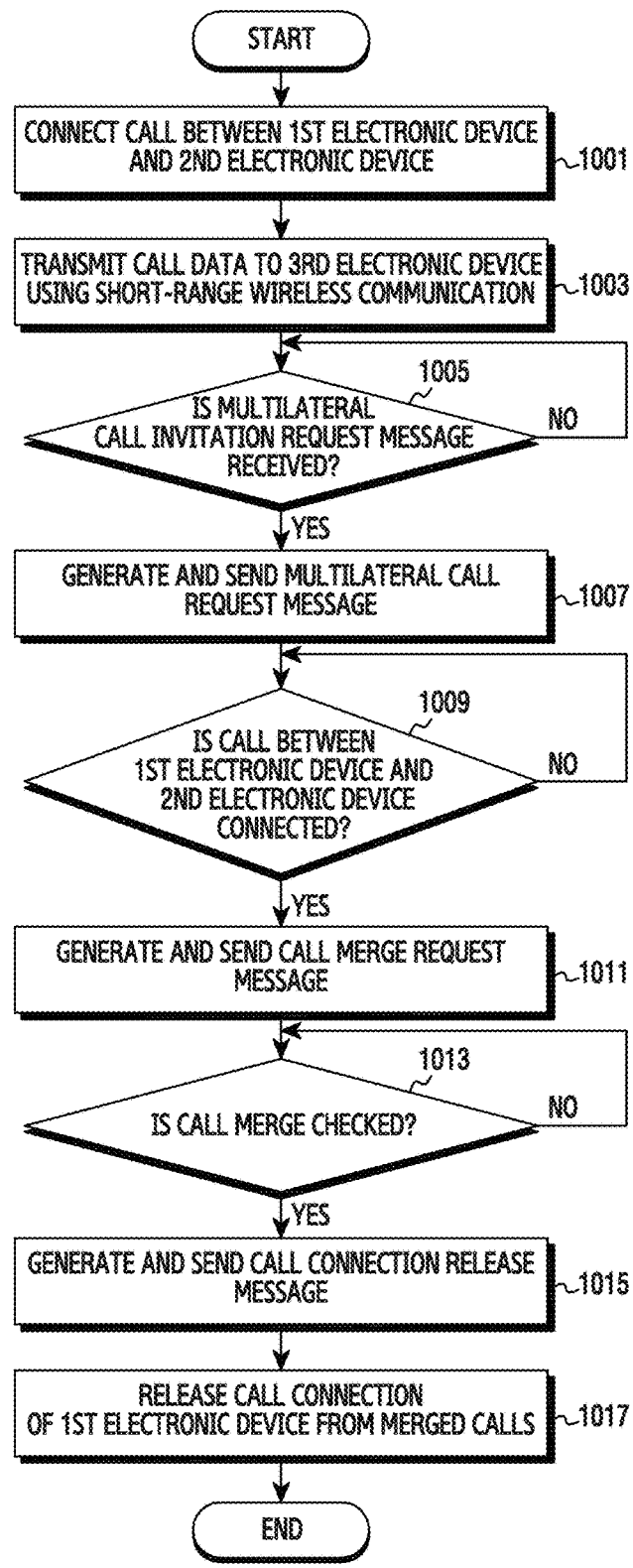
FIG. 10 is a flowchart illustrating an operation of connecting a call between a second electronic device and a third electronic device in a first electronic device according to various embodiments of the present disclosure.

FIG. 10 is a flowchart illustrating an operation of connecting a call between a second electronic device and a third electronic device in a first electronic device according to various embodiments of the present disclosure. The first electronic device 101 may be communicating with the third electronic device 103 using the short-range wireless communication, and be communicating with the BS 510 using the cellular communication.

Referring to FIG. 10, in operation 1001, the first electronic device 101 may connect a call with the second electronic device 102 through the BS 510. For example, the first electronic device 101 may transmit or receive call data to/from the second electronic device 102 through the connected call. In operation 1003, the first electronic device 101 may use the short-range wireless communication to transmit the received call data to the third electronic device 103 or receive call data from the third electronic device 103. Or, the first electronic device 101 may transmit the call data received from the third electronic device 103, to the second electronic device 102 through the connected call.

In operation 1005, the first electronic device 101 may check whether a multilateral call invitation request message is received from the third electronic device 103. If the checking result is that the multilateral call invitation request message is received, the first electronic device 101 may proceed to operation 1007 and otherwise, may repeatedly perform operation 1005. For example, if the multilateral call invitation request message is received from the third electronic device 103, as in FIG. 14, the first electronic device 101 may display a notification message 1401 of notifying to convert an indirect call environment between the second electronic device 102 and the third electronic device 103 into a direct call environment. For another example, the first electronic device 101 may output the notification message 1401 by a voice through a speaker.

If going to operation 1007, the first electronic device 101 may generate a multilateral call request message and send the generated multilateral call request message to the BS 510. In operation 1009, the first electronic device 101 may check whether a call is connected between the first electronic device 101 and the third electronic device 103. If the checking result is that the call is connected between the first electronic device 101 and the third electronic device 103, the first electronic device 101 may proceed to operation 1011 and otherwise, may repeatedly perform operation 1009.

If proceeding to operation 1011, the first electronic device 101 may generate a call merge request message and send the generated call merge request message to the BS 510. In operation 1013, the first electronic device 101 may check whether an individual call between the first electronic device 101 and the second electronic device 102 and an individual call between the first electronic device 101 and the third electronic device 103 are merged with each other. If the checking result is that the calls are merged with each other, the first electronic device 101 may proceed to operation 1015 and otherwise, may repeatedly perform operation 1013.

In operation 1015, the first electronic device 101 may generate a call connection release message and send the generated call connection release message to the BS 510. In operation 1017, the first electronic device 101 may release the call of the first electronic device 101 from the merged calls, so as to directly connect a call between the second electronic device 102 and the third electronic device 103.

Figure 11:
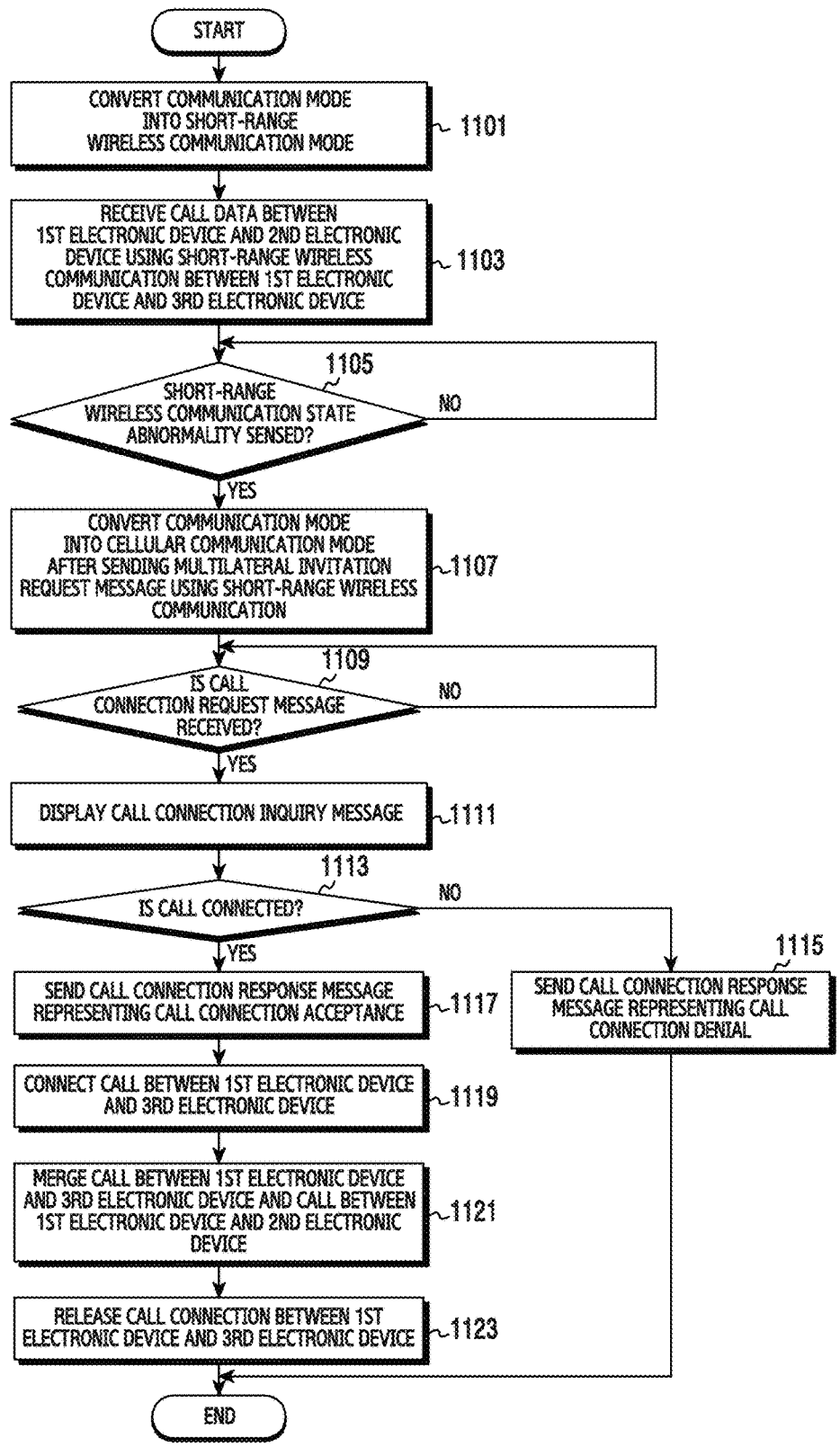
FIG. 11 is a flowchart illustrating an operation of connecting a call between a second electronic device and a third electronic device in the third electronic device according to various embodiments of the present disclosure.

FIG. 11 is a flowchart illustrating an operation of connecting a call between a second electronic device and a third electronic device in the third electronic device according to various embodiments of the present disclosure. The first electronic device 101 may connect a call with the second electronic device 102 through the BS 510 using cellular communication.

Referring to FIG. 11, in operation 1101, the third electronic device 103 may convert a communication mode into a short-range wireless communication mode or maintain the short-range wireless communication mode. For example, the third electronic device 103 may connect a communication with the first electronic device 101 using short-range wireless communication.

In operation 1103, the third electronic device 103 may use the short-range wireless communication to receive call data from the first electronic device 101 or transmit call data to the first electronic device 101. For example, the third electronic device 103 may receive call data between the first electronic device 101 and the second electronic device 102, convert the received call data into a voice signal, and output the voice signal through a speaker. For another example, the third electronic device 103 may receive a voice signal through a microphone, convert the received voice signal into call data, and transmit the call data to the first electronic device 101.

In operation 1105, the third electronic device 103 may check a communication state (or a communication connection state) of the short-range wireless communication. For example, the third electronic device 103 may check whether the communication state of the short-range wireless communication is abnormal based on a signal strength of the received call data, a data rate, a data error rate, or communication connection release or non-release.

For example, the third electronic device 103 may measure a signal strength of the call data. If the measured signal strength of the call data is less than a predesignated reference value, the third electronic device 103 may determine that the communication state of the short-range wireless communication is abnormal. Unlike this, if the measured signal strength of the call data is equal to or is greater than the reference value, the third electronic device 103 may determine that the communication state of the short-range wireless communication is normal. For another example, the third electronic device 103 may determine the number of cases in which the measured signal strength of the call data is less than the reference value during a predesignated time. If the determined number is equal to or is greater than a reference value, the third electronic device 103 may determine that the communication state of the short-range wireless communication is abnormal. Unlike this, if the determined number is less than the reference value, the third electronic device 103 may determine that the communication state of the short-range wireless communication is normal.

For further example, if a connection of short-range wireless communication with the first electronic device 101 is released compulsorily, the third electronic device 103 may determine that the communication state of the short-range wireless communication is abnormal. Unlike this, if the connection of the short-range wireless communication with the first electronic device 101 is maintained, the third electronic device 103 may determine that the communication state of the short-range wireless communication is normal.

If it is sensed that the communication state of the short-range wireless communication is abnormal as the checking result, the third electronic device 103 may proceed to operation 1107 and otherwise, may repeatedly perform operation 1105.

In operation 1107, the third electronic device 103 may generate a multilateral call invitation request message, and send the generated multilateral call invitation request message to the first electronic device 101 using the short-range wireless communication. And, to communicate with the BS 510, the third electronic device 103 may convert the communication mode from the short-range wireless communication mode to the cellular communication mode. For example, if the multilateral call invitation request message is sent to the first electronic device 101, the third electronic device 103 may, as in FIG. 15, display a notification message 1501 of notifying to convert an indirect call environment between the second electronic device 102 and the third electronic device 103 into a direct call environment. For another example, the third electronic device 103 may output the notification message 1501 by a voice through a speaker.

In operation 1109, the third electronic device 103 may check whether a call connection request message is received from the BS 510. If the checking result is that the call connection request message is received, the third electronic device 103 proceed to operation 1111 and otherwise, may repeatedly perform operation 1109. If going to operation 1111, the third electronic device 103 may display a call connection inquiry message of inquiring of a user whether to connect a call or not.

In operation 1113, the third electronic device 103 may receive a response including call connection acceptance or non-acceptance from the user. If the response is a call connection acceptance as the reception result, the third electronic device 103 may proceed to operation 1117 and otherwise, may proceed to operation 1115. If proceeding to operation 1115, the third electronic device 103 may generate a call connection response message including information representing a call connection denial and send the generated call connection response message to the BS 510. If proceeding to operation 1117, the third electronic device 103 may generate a call connection response message including information representing the call connection acceptance and send the generated call connection response message to the BS 510.

In operation 1119, the third electronic device 103 may check that a call is connected between the first electronic device 101 and the third electronic device 103. In operation 1121, the third electronic device 103 may check that an individual call between the first electronic device 101 and the third electronic device 103 and an individual call between the first electronic device 101 and the second electronic device 102 are merged with each other. In operation 1123, the third electronic device 103 may check that the call between the first electronic device 101 and the third electronic device 103 is released from the merged calls, so as to directly connect a call between the second electronic device 102 and the third electronic device 103.

Figure 12:
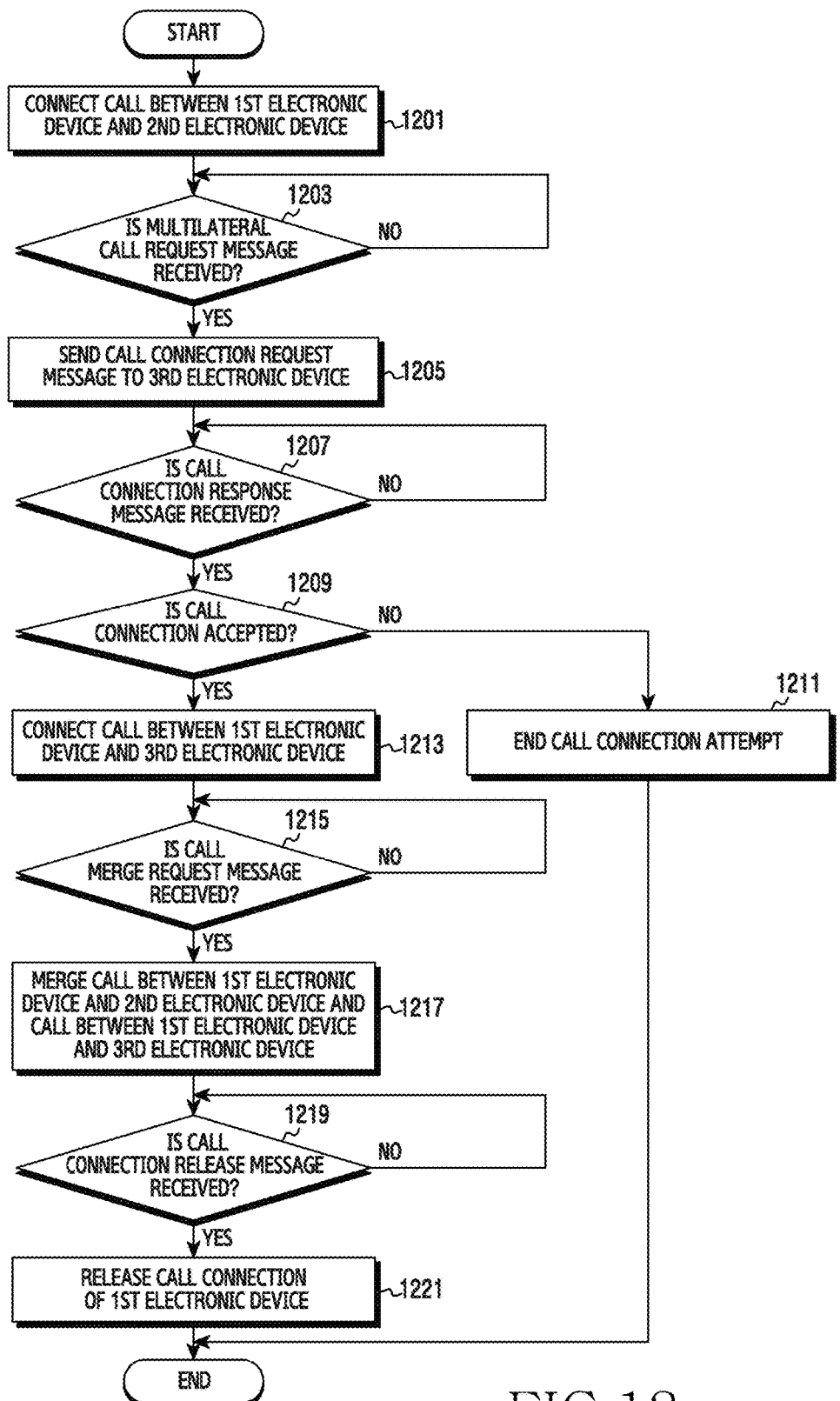
FIG. 12 is a flowchart illustrating an operation of connecting a call between a second electronic device and a third electronic device in a base station according to various embodiments of the present disclosure.

FIG. 12 is a flowchart illustrating an operation of connecting a call between a second electronic device and a third electronic device in a BS according to various embodiments of the present disclosure.

Referring to FIG. 12, in operation 1201, the BS 510 may connect a call between the first electronic device 101 and the second electronic device 102. For example, the BS 510 may transmit/receive communication data between the first electronic device 101 and the second electronic device 102 through the call.

In operation 1203, the BS 510 may check whether a multilateral call request message is received from the first electronic device 101. If the checking result is that the multilateral call request message is received from the first electronic device 101, the BS 510 may proceed to operation 1205 and otherwise, may repeatedly perform operation 1203.

In operation 1205, the BS 510 may generate a call connection request message and send the call connection request message to the third electronic device 103. For example, the call connection request message may be a message of requesting a call connection between the first electronic device 101 and the third electronic device 103. At this time, the third electronic device 103 which a communication mode is a cellular communication mode may communicate with the BS 510 using cellular communication. In operation 1207, the BS 510 may check whether it receives a call connection response message from the third electronic device 103. If the checking result is that the call connection response message is received, the BS 510 may proceed to operation 1209 and otherwise, may repeatedly perform operation 1207.

In operation 1209, based on the received call connection response message, the BS 510 may check whether a call connection between the first electronic device 101 and the third electronic device 103 is accepted. For example, if the call connection response message includes information representing a denial of the call connection, the BS 510 may determine that the third electronic device 103 denies the call connection. For another example, if the call connection response message includes information representing an acceptance of the call connection, the BS 510 may determine that the third electronic device 103 accepts the call connection. If the checking result is that the call connection between the first electronic device 101 and the third electronic device 103 is accepted, the BS 510 may proceed to operation 1213 and otherwise, may proceed to operation 1211.

If proceeding to operation 1211, the BS 510 may end an attempt of the call connection between the first electronic device 101 and the third electronic device 103. If proceeding to operation 1213, the BS 510 may connect a call between the first electronic device 101 and the third electronic device 103.

In operation 1215, the BS 510 may check whether a call merge request message is received from the first electronic device 101. If the checking result is that the call merge request message is received, the BS 510 may proceed to operation 1217 and otherwise, repeatedly perform operation 1215. If proceeding to operation 1217, the BS 510 may merge an individual call between the first electronic device 101 and the second electronic device 102 and an individual call between the first electronic device 101 and the third electronic device 103.

In operation 1219, the BS 510 may check whether a call connection release message is received from the first electronic device 101. If the checking result is that the call connection release message is received, the BS 510 may proceed to operation 1221 and otherwise, may repeatedly perform operation 1219.

If proceeding to operation 1221, the BS 510 may release the call of the first electronic device 101 from the merged calls, so as to directly connect a call between the second electronic device 102 and the third electronic device 103.

Figure 13:
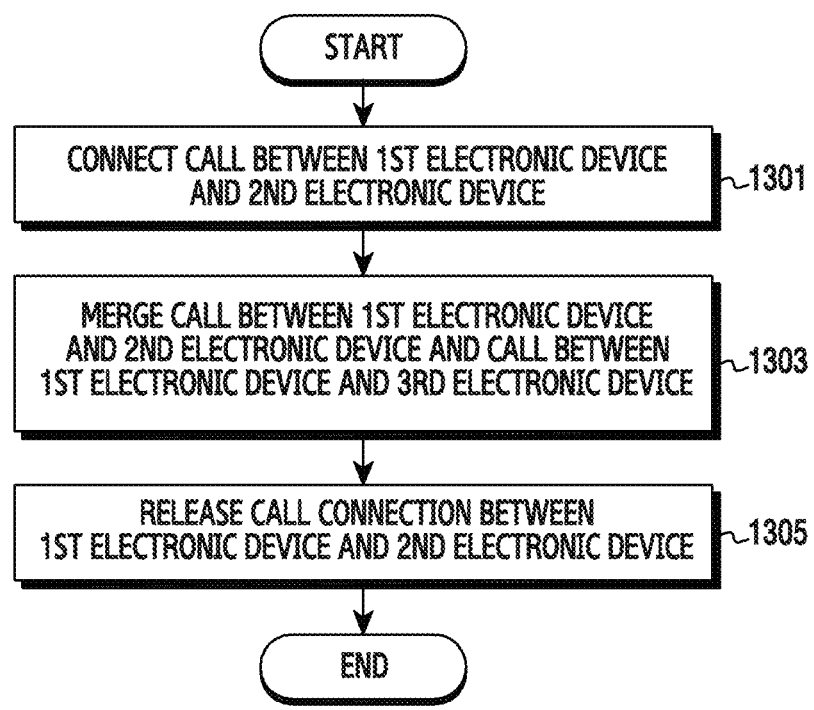
FIG. 13 is a flowchart illustrating an operation of connecting a call between a second electronic device and a third electronic device in the second electronic device according to various embodiments of the present disclosure.

FIG. 13 is a flowchart illustrating an operation of connecting a call between a second electronic device and a third electronic device in the second electronic device according to various embodiments of the present disclosure.

Referring to FIG. 13, in operation 1301, the second electronic device 102 may connect a call between the first electronic device 101 and the second electronic device 102 through the BS 510. For example, the second electronic device 102 may transmit or receive call data to/from the first electronic device 101 through the connected call. In operation 1303, the second electronic device 102 may check that an individual call between the first electronic device 101 and the second electronic device 102 and an individual call between the first electronic device 101 and the third electronic device 103 are merged with each other.

In operation 1305, the second electronic device 102 may check that the call between the first electronic device 101 and the second electronic device 102 is released from the merged calls, so as to directly connect a call between the second electronic device 102 and the third electronic device 103.

FIG. 14 is a diagram illustrating an operation of outputting a notification of a call connection between a second electronic device and a third electronic device in a first electronic device according to various embodiments of the present disclosure.

Referring to FIG. 14, the first electronic device 101 may display a notification message of notifying to convert an indirect call environment between the second electronic device 102 and the third electronic device 103 into a direct call environment. For example, the first electronic device 101 may display a notification message 1401 including a phrase "Communication state with third electronic device being in BT connection is poor. Convert into direct call environment". For another example, the first electronic device 101 may output the notification message 1401 by a voice through a speaker.

Figure 15:
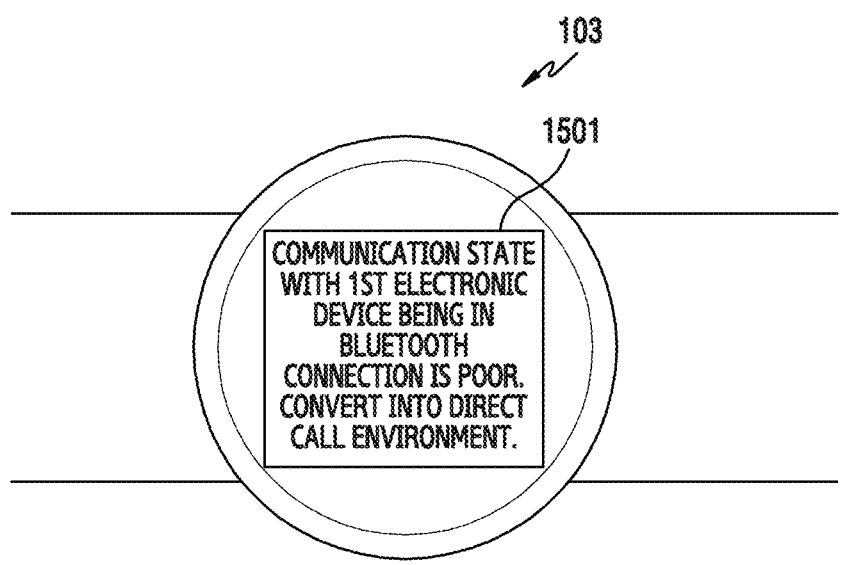
FIG. 15 is a diagram illustrating an operation of outputting a notification of a call connection between a second electronic device and a third electronic device in the third electronic device according to various embodiments of the present disclosure.

FIG. 15 is a diagram illustrating an operation of outputting a notification of a call connection between a second electronic device and a third electronic device in the third electronic device according to various embodiments of the present disclosure.

Referring to FIG. 15, the third electronic device 103 may display a notification message of notifying to convert an indirect call environment between the second electronic device 102 and the third electronic device 103 into a direct call environment. For example, the third electronic device 103 may display a notification message 1501 including a phrase "Communication state with first electronic device being in BT connection is poor. Convert into direct call environment". For another example, the third electronic device 103 may output the notification message 1401 by a voice through a speaker.

According to various embodiments of the present disclosure, when the first electronic device 101 relays call data between the first electronic device 101 and the second electronic device 102 to the third electronic device 103 connected through short-range wireless communication, if a communication state of the short-range wireless communication is unstable, the first electronic device 101 may directly connect a call between the second electronic device 102 and the third electronic device 103, thereby providing a seamless call quality.

The present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Further, various embodiments disclosed in this document are only for the description and understanding of technical contents and do not limit the present disclosure. Accordingly, the present disclosure should be construed as including all modifications or various other embodiments based on the technical idea of the present disclosure.

The above-described embodiments of the present disclosure can be implemented in hardware, firmware or via the execution of software or computer code that can be stored in a recording medium such as a compact disc ROM (CD-ROM), a DVD, a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an application specific integrated circuit (ASIC) or field programmable gate array (FPGA). As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

Further, the 'module' may be provided as a computer-readable storage media storing one or more programs (or programming modules and applications). For instance, the software may be implemented by an instruction stored in a computer-readable storage media in a form of the programming module. The one or more programs may include instructions for enabling an electronic device to execute methods according to an embodiment stated in the claims and/or specification of the present disclosure. If the instruction is executed by one or more processors (e.g., the processor 120), the one or more processors may perform a function corresponding to the instruction. The computer-readable storage media may be, for example, the memory 230. At least a part of the programming module may be, for example, implemented (e.g., executed) by the processor 210. At least a part of the programming module may include, for example, a module, a program, a routine, sets of instructions, or a process, etc. for performing one or more functions.

The computer-readable recording media includes a magnetic media such as a hard disk, a floppy disk, and a magnetic tape, an optical media such as a CD-ROM and a DVD, a Magneto-Optical Media such as a floptical disk, and a hardware device specially configured to store and perform a program instruction (e.g., a programming module) such as a ROM, a RAM, a flash memory, etc., an EEPROM, a magnetic disc storage device or an optical storage device of other form, and a magnetic cassette. Or, the program instruction may be stored in a memory constructed by a combination of some or all of them. Also, each construction memory may be also included in plural. Also, the program instruction includes not only a mechanical language code such as a code made by a compiler but also a high-level language code executable by a computer using an interpreter, etc.

Further, the program instruction may be stored in an attachable storage device accessible to an electronic device through a communication network such as the Internet, an intranet, a local area network (LAN), a wireless LAN (WLAN) and a storage area network (SAN) or a communication network constructed by a combination of them. This storage device may connect to the electronic device through an external port. Also, a separate storage device on the communication network may connect to a portable electronic device as well. The aforementioned hardware device may be configured to operate as one or more software modules so as to perform operations according to various embodiments of the present disclosure, and vice versa.

The module or programming module according to various embodiments of the present disclosure may include at least one or more of the aforementioned constituent elements, or omit some of the aforementioned constituent elements, or further include additional other constituent elements. Operations carried out by the module, the programming module or other constituent elements according to various embodiments of the present disclosure may be executed in a sequential, parallel, repeated or heuristic method. Also, some operations may be executed in different order or may be omitted, or other operations may be added.

For example, in various embodiments of the present disclosure, it is mentioned that the third electronic device 103 sends a multilateral call invitation request message to the first electronic device 101 based on a communication state of short-range wireless communication, but other electronic device may check the communication state of the short-range wireless communication. For example, the first electronic device 101 may check the communication state of the short-range wireless communication, and generate a multilateral call request message based on the checked communication state and send the generated multilateral call invitation request message to the BS 510.

While the present disclosure has been shown and described with reference to various embodiments thereof, it will be understood by those skilled in the art that various changes in form and details may be made therein without departing from the spirit and scope of present disclosure as defined by the appended claims and their equivalents.

What is claimed is:

1. A method of operating a first electronic device, the method comprising:
   transmitting call data received through a first call between the first electronic device and a third electronic device to a second electronic device, using short-range wireless communication connected with the second electronic device;
   if a communication abnormality of the short-range wireless communication takes place, connecting a second call between the first electronic device and the second electronic device;
   generating a third call by merging the first call and the second call; and
   releasing a call connection of the first electronic device from the third call.

2. The method of claim 1, wherein the communication abnormality is determined based on at least one of a signal strength of the call data, a data rate, a data error rate, and short-range wireless communication connection release or non-release.

3. The method of claim 1, wherein the connecting of the second call between the first electronic device and the second electronic device further comprises:
   releasing a connection of the short-range wireless communication; and
   sending a base station a call connection request message for connecting the second call, using cellular communication.

4. The method of claim 1, wherein the connecting of the second call between the first electronic device and the second electronic device further comprises sending the second electronic device a message requesting to turn on a power source of a cellular communication interface of the second electronic device, using the short-range wireless communication.

5. The method of claim 1, wherein the connecting of the second call between the first electronic device and the second electronic device further comprises outputting a notification of directly connecting a call between the second electronic device and the third electronic device.

6. The method of claim 1, wherein the generating of the third call by merging the first call and the second call further comprises:
   sending a base station a call merge request message for merging the first call and the second call; and
   checking the merging of the first call and the second call.

7. A method of operating a second electronic device, the method comprising:
   receiving call data received through a first call between a first electronic device and a third electronic device using short-range wireless communication connected with the first electronic device, from the first electronic device;
   if a communication abnormality of the short-range wireless communication takes place, connecting a second call between the first electronic device and the second electronic device; and
   directly connecting a call between the second electronic device and the third electronic device by releasing a call connection of the first electronic device from a third call generated from a merging of the first call and the second call.

8. The method of claim 7, wherein the communication abnormality is determined based on at least one of a signal strength of the call data, a data rate, a data error rate, and short-range wireless communication connection release or non-release.

9. The method of claim 7, wherein the connecting of the second call between the first electronic device and the second electronic device further comprises:
   sending the first electronic device a message for connection of the second call, using the short-range wireless communication;
   converting the short-range wireless communication into cellular communication; and
   connecting the second call between the first electronic device and the second electronic device, using the cellular communication.

10. The method of claim 7, wherein the connecting of the second call between the first electronic device and the second electronic device further comprises outputting a notification of directly connecting a call between the second electronic device and the third electronic device.

11. A first electronic device comprising:
    a short-range wireless communication interface configured to support short-range wireless communication;
    a cellular communication interface configured to support cellular communication; and
    at least one processor configured to:
      transmit call data received through a first call between the first electronic device and a third electronic device to a second electronic device, using a short-range wireless communication connected with the second electronic device,
      connect a second call between the first electronic device and the second electronic device if a communication abnormality of the short-range wireless communication takes place,
      generate a third call by merging the first call and the second call, and
      release a call connection of the first electronic device from the third call.

12. The first electronic device of claim 11, wherein the communication abnormality is determined based on at least one of a signal strength of the call data, a data rate, a data error rate, and short-range wireless communication connection release or non-release.

13. The first electronic device of claim 11, wherein the processor is configured to:
    release a connection of the short-range wireless communication, and
    send a base station a call connection request message for connecting the second call, using the cellular communication.

14. The first electronic device of claim 11, wherein the processor is configured to send the second electronic device a message requesting to turn on a power source of a cellular communication interface comprised in the second electronic device, using the short-range wireless communication.

15. The first electronic device of claim 11, wherein the processor is configured to output a notification of directly connecting a call between the second electronic device and the third electronic device.

16. The first electronic device of claim 11, wherein the processor is configured to:
send a base station a call merge request message for merging the first call and the second call, and
check the merging of the first call and the second call.

17. A second electronic device comprising:
a short-range wireless communication interface configured to support short-range wireless communication;
a cellular communication interface configured to support cellular communication; and
a processor configured to:
receive call data received through a first call between a first electronic device and a third electronic device using the short-range wireless communication connected with the first electronic device, from the first electronic device,
connect a second call between the first electronic device and the second electronic device if a communication abnormality of the short-range wireless communication takes place, and
directly connect a call between the second electronic device and the third electronic device by releasing a call connection of the first electronic device from a third call generated from a merging of the first call and the second call.

18. The second electronic device of claim 17, wherein the communication abnormality is determined based on at least one of a signal strength of the call data, a data rate, a data error rate, and short-range wireless communication connection release or non-release.

19. The second electronic device of claim 17, wherein the processor is further configured to:
send the first electronic device a message for connection of the second call, using the short-range wireless communication,
convert the short-range wireless communication into cellular communication, and
connect the second call between the first electronic device and the second electronic device, using the cellular communication.

20. The second electronic device of claim 17, wherein the processor is further configured to output a notification of directly connecting a call between the second electronic device and the third electronic device.

* * * * *